(12) United States Patent
Kim

(10) Patent No.: US 12,362,971 B2
(45) Date of Patent: Jul. 15, 2025

(54) RECEIVERS AND SEMICONDUCTOR MEMORY DEVICES INCLUDING THE SAME

(71) Applicant: Samsung Electronics Co., Ltd., Suwon-si (KR)

(72) Inventor: Hyochang Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 105 days.

(21) Appl. No.: 18/487,389

(22) Filed: Oct. 16, 2023

(65) Prior Publication Data

US 2024/0430140 A1    Dec. 26, 2024

(30) Foreign Application Priority Data

Jun. 22, 2023  (KR) ........................ 10-2023-0080194

(51) Int. Cl.
*H04L 25/03* (2006.01)
*H04B 1/12* (2006.01)

(52) U.S. Cl.
CPC ......... *H04L 25/03267* (2013.01); *H04B 1/12* (2013.01)

(58) Field of Classification Search
CPC ..... G11C 7/1078; G11C 7/109; G11C 7/1093; G11C 11/4096; H04B 1/12; H04L 25/03267; H04L 25/03057; H04L 25/03146; H04L 25/4917
See application file for complete search history.

(56) References Cited

U.S. PATENT DOCUMENTS

| 8,121,183 B2 * | 2/2012 | Zhong ............... H04L 25/03057 375/233 |
| 8,283,982 B2 | 10/2012 | Chung et al. |
| 9,215,108 B2 | 12/2015 | Amamiya |
| 9,294,313 B2 | 3/2016 | Prokop et al. |
| 9,467,312 B2 | 10/2016 | Ganzerli et al. |
| 9,565,037 B1 * | 2/2017 | Liu .................... H04L 25/03057 |
| 10,326,623 B1 | 6/2019 | Tajalli |
| 10,523,472 B1 * | 12/2019 | Zhao .................. H04L 25/0328 |
| 11,477,057 B1 | 10/2022 | Bhuta et al. |
| 2016/0173300 A1 * | 6/2016 | Laufer ............. H04L 25/03885 375/233 |

OTHER PUBLICATIONS

Duan et al. "A 12.8 GS/s Time-Interleaved ADC With 25 GHz Effective Resolution Bandwidth and 4.6 ENOB" IEEE Journal of Solid-State Circuits 49(8):1725-1738 (Aug. 2014).
Wang et al. "A 64-GB/s 4-PAM Transceiver Utilizing an Adaptive Threshold ADC in 16-nm FinFET" IEEE Journal of Solid-State Circuits 54(2):452-462 (Feb. 2019).

* cited by examiner

*Primary Examiner* — Dac V Ha
(74) *Attorney, Agent, or Firm* — Myers Bigel, P.A.

(57) ABSTRACT

A receiver includes a decision feedback equalizer therein. The equalizer, which includes a cascaded arrangement of a first stage having a first plurality of summers therein and a second stage having a second plurality of summers therein, is configured to: (i) generate a compensated data signal by summing a current value of a data signal and a plurality of feedback signals, in response to a plurality of selection signals, (ii) generate a sampled signal including a decision value by sampling bits of the compensated data signal, in response to a plurality of divided strobe signals, and (iii) generate the feedback signals in response to a plurality of weights, the sampled signal, and at least one delayed version of the sampled signal.

20 Claims, 24 Drawing Sheets

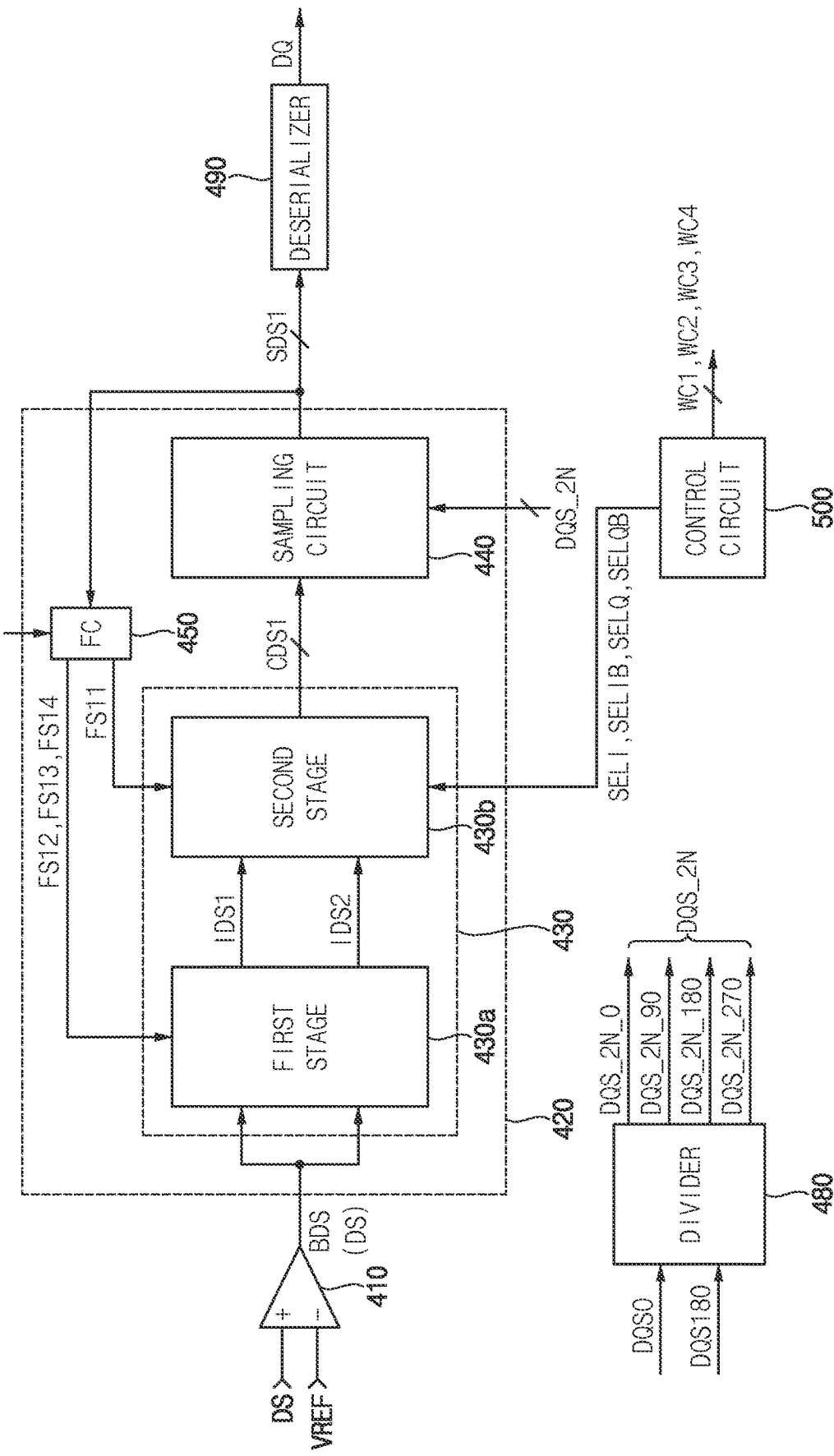

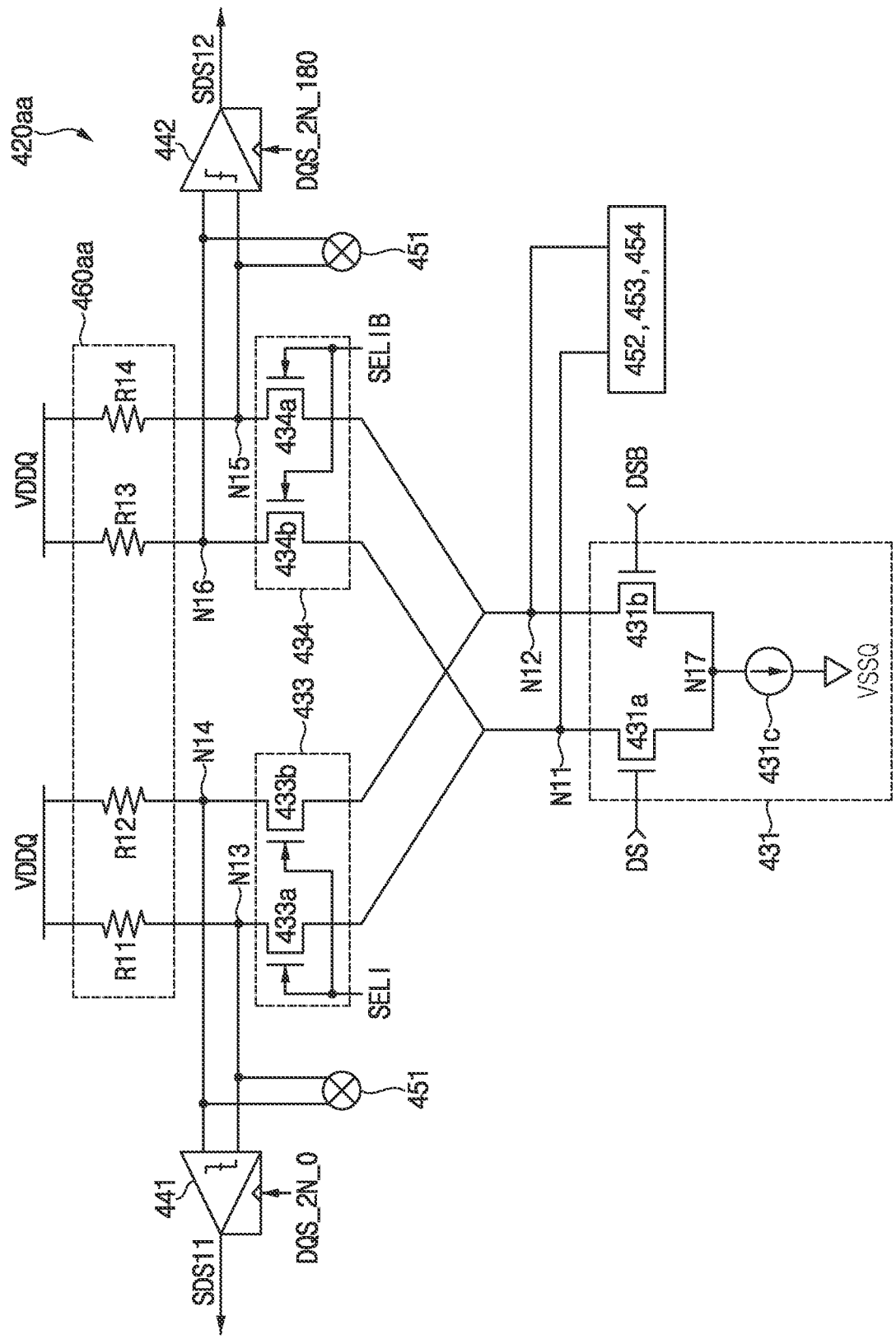

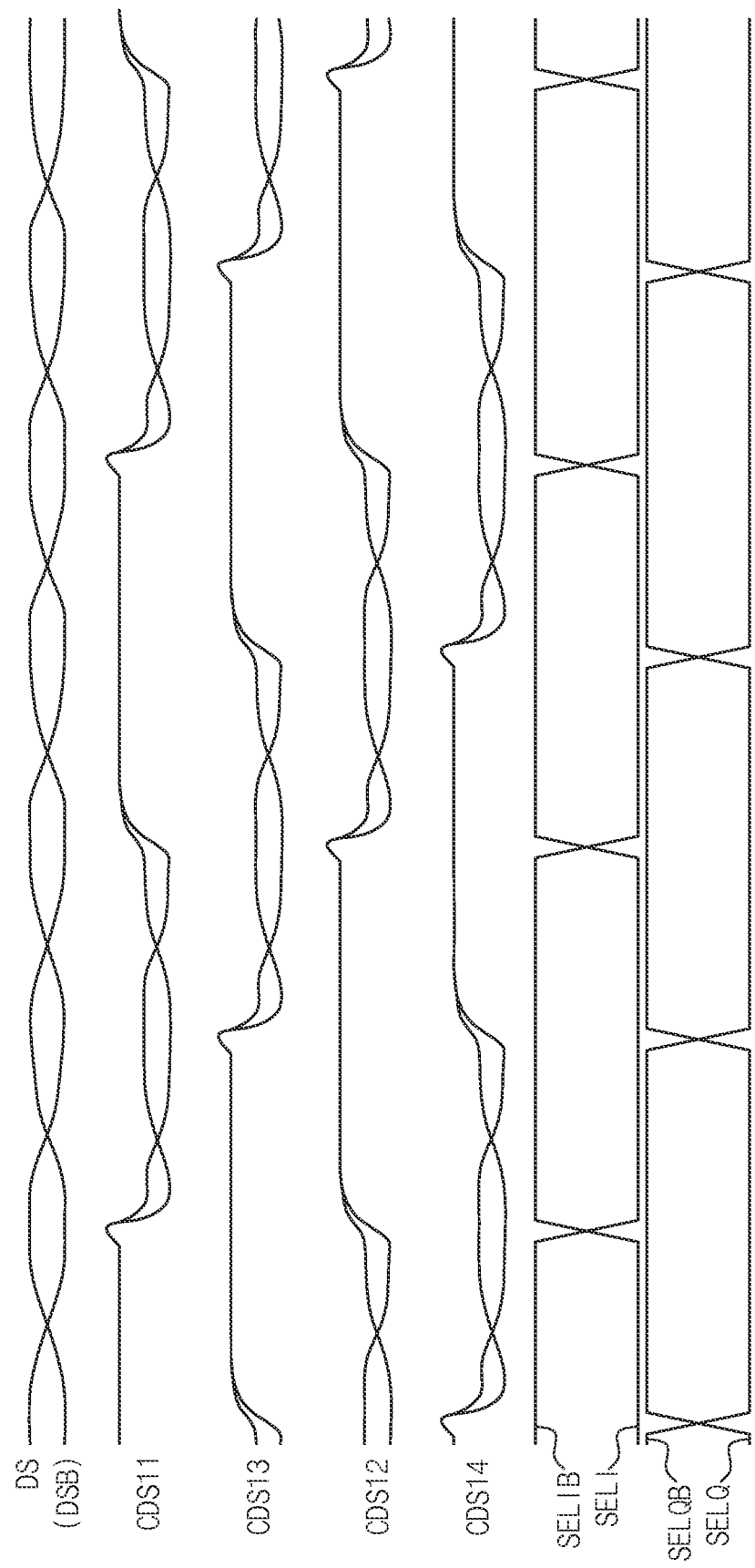

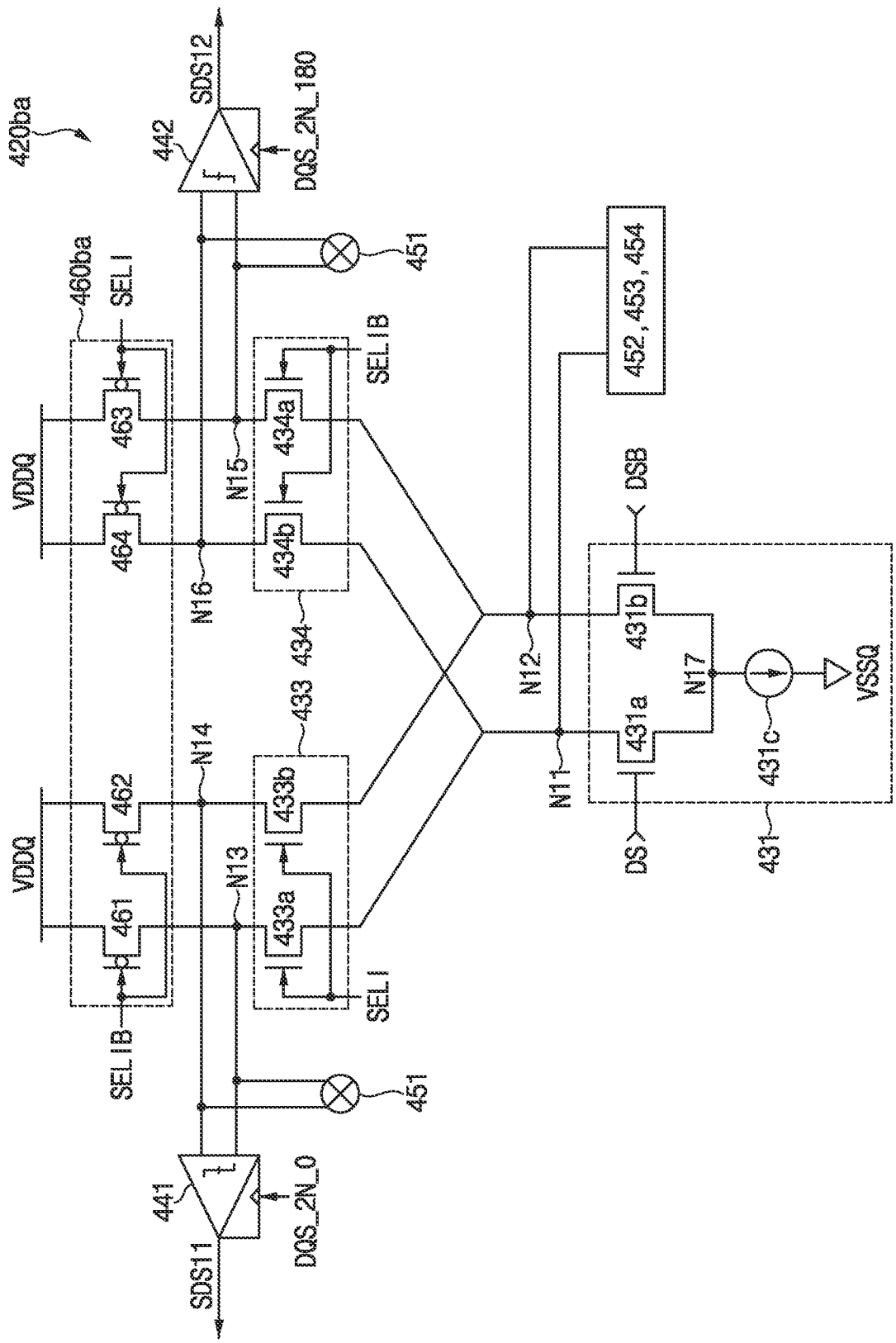

FIG. 16

RECEIVERS AND SEMICONDUCTOR MEMORY DEVICES INCLUDING THE SAME

REFERENCE TO PRIORITY APPLICATION

This application claims priority under 35 USC § 119 to Korean Patent Application No. 10-2023-0080194, filed Jun. 22, 2023, the disclosure of which is hereby incorporated herein by reference.

BACKGROUND

1. Technical Field

Example embodiments relate generally to semiconductor integrated circuits and, more particularly, to receivers capable of securing sufficient timing margins and semiconductor memory devices including the same.

2. Description of the Related Art

Semiconductor memory devices can generally be divided into two categories depending upon whether or not they retain stored data when disconnected from a power supply. These categories include volatile memory devices, which lose stored data when disconnected from power, and nonvolatile memory devices, which retain stored data when disconnected from power. Volatile memory devices may perform read and write operations at a high speed, while contents stored therein may be lost at power-off. Nonvolatile memory devices may retain contents stored therein even at power-off, which means they may be used to store data that must be retained regardless of whether they are powered.

Recently, as the performance of the semiconductor memory devices have improved, higher communication speeds (or interface speeds) are required between memory controllers and semiconductor memory devices. The requirements of higher communication speeds may influence performance of a receiver within a semiconductor memory device.

SUMMARY

Some example embodiments provide an integrated circuit receiver capable of reducing power consumption and increasing operating speed when supporting higher data communication speeds.

Some example embodiments provide integrated circuit devices having receivers therein that are capable of operating with reduced power consumption, while supporting higher operating speeds that enable higher data communication speeds.

According to example embodiments, a receiver includes a decision feedback equalizer, and may further include a deserializer and a control circuit. The decision feedback equalizer includes a first stage and a second stage which include a plurality of summers that are cascade-connected. The decision feedback equalizer is configured to generate a compensated data signal by summing a current value of a data signal and a plurality of feedback signals, in response to a plurality of selection signals, and generate a sampled signal including a decision value by sampling bits of the compensated data signal in response to divided strobe signals. In some embodiments, the decision feedback equalizer further generates the feedback signals based on a combination of weights and the sampled signal corresponding to a previous value of the data signal, and also provides a first portion of the feedback signals to the second stage and a second portion of the feedback signals to the first stage.

According to additional embodiments, a semiconductor memory device includes a receiver and a control logic circuit. The receiver is connected to a memory controller through a channel, and generates an output data based on a data signal received from the channel. The control logic circuit controls the receiver. The receiver includes a decision feedback equalizer, a deserializer and a control circuit. The decision feedback equalizer includes a first stage and a second stage, which include a plurality of summers that are cascade-connected. The decision feedback equalizer is configured to generate a compensated data signal by summing a current value of a data signal and feedback signals based on a plurality of selection signals, and generate a sampled signal including a decision value by sampling bits of the compensated data signal based on divided strobe signals. The equalizer is also configured to generate the feedback signals based on weights and the sampled signal corresponding to a previous value of the data signal. In addition, a first portion of the feedback signals are provided to the second stage, and a second portion of the feedback signals are provided to the first stage.

According to further example embodiments, a receiver includes a decision feedback equalizer, a deserializer and a control circuit. The decision feedback equalizer includes a first stage and a second stage, which include a plurality of summers that are cascade-connected, and is configured to: (i) generate a compensated data signal by summing a current value of a data signal and feedback signals based on a plurality of selection signals, (ii) generate a sampled signal including a decision value by sampling bits of the compensated data signal based on divided strobe signals, (iii) generate the feedback signals based on weights and the sampled signal corresponding to a previous value of the data signal, and (iv) provide a first portion of the feedback signals to the second stage and a second portion of the feedback signals to the first stage. The deserializer may also generate output data by deserializing the sampled signal. In some embodiments, the control circuit may generate the plurality of selection signals and provide the plurality of selection signals to the decision feedback equalizer. The decision feedback equalizer may generate a first internal data signal and a second internal data signal by summing the data signal and the second portion of the feedback signals and generate the compensated data signal by summing a combination of the first internal data signal, the second internal data signal and the first portion of the feedback signals using a time division scheme based on the plurality selection signals.

Accordingly, the decision feedback equalizer of the receiver according to example embodiments includes a plurality of summers that are cascade-connected and divided into a first stage and a second stage. The equalizer provides a first portion of feedback signals to the second stage and provides second portions of the feedback signals to the first stage. Advantageously, a critical path and a non-critical path are separated from each other and the decision feedback equalizer can operate with high speed. In addition, the summers in the second stage generate bits of compensated data signal by operating using a time division scheme, in response to a plurality of selection signals, so that power consumption can be reduced.

BRIEF DESCRIPTION OF THE DRAWINGS

Illustrative, non-limiting example embodiments will be more clearly understood from the following detailed description taken in conjunction with the accompanying drawings.

FIG. 7A is a block diagram illustrating an example of a receiver according to example embodiments.

FIG. 8A illustrates a first portion of the decision feedback equalizer of FIG. 7B according to example embodiments.

FIG. 9B is a timing diagram illustrating examples of the data signal, the selection signals and the compensated data signal in FIG. 7A through 8B.

FIG. 11A illustrates a first portion of the decision feedback equalizer of FIG. 7B according to example embodiments.

FIG. 16 is a block diagram illustrating an example of the receiver of FIG. 14 according to example embodiments.

DETAILED DESCRIPTION OF THE EMBODIMENTS

Figure 1:
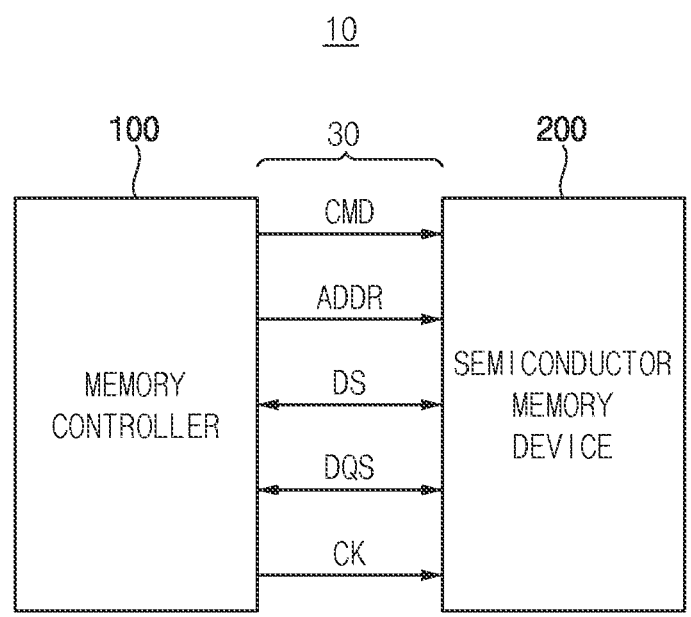
FIG. 1 is a block diagram illustrating a memory system according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a block diagram illustrating a memory system according to example embodiments. Referring to FIG. 1, a memory system 10 may include a memory controller 100 and a semiconductor memory device 200. The memory system 10 may further include a plurality of signal lines 30 that electrically connect the memory controller 100 with the semiconductor memory device 200. The semiconductor memory device 200 may be controlled by the memory controller 100. For example, based on requests from a host (not illustrated), the memory controller 100 may store data (e.g., write or program data) into the semiconductor memory device 200, or may retrieve data (e.g., read or sense data) from the semiconductor memory device 200.

The plurality of signal lines 30 may include command lines, address lines and data input/output (I/O) lines, for example. The memory controller 100 may transmit a command CMD and an address ADDR to the semiconductor memory device 200 via the command lines and the address lines, and may exchange a data signal DS with the semiconductor memory device 200 via the data I/O lines. Although not illustrated, the plurality of signal lines 30 may further include a data strobe signal line that is configured to transfer a data strobe signal DQS and a clock line that is configured to transfer a clock signal CK.

In some example embodiments, at least a part or all of the signal lines 30 may be referred to as a channel. The term "channel" as used herein may represent signal lines that include the data I/O lines for transmitting the data signal DS. However, example embodiments are not limited thereto, and the channel may further include the command lines for transmitting the command CMD and/or the address lines for transmitting the address ADDR.

Figure 2:
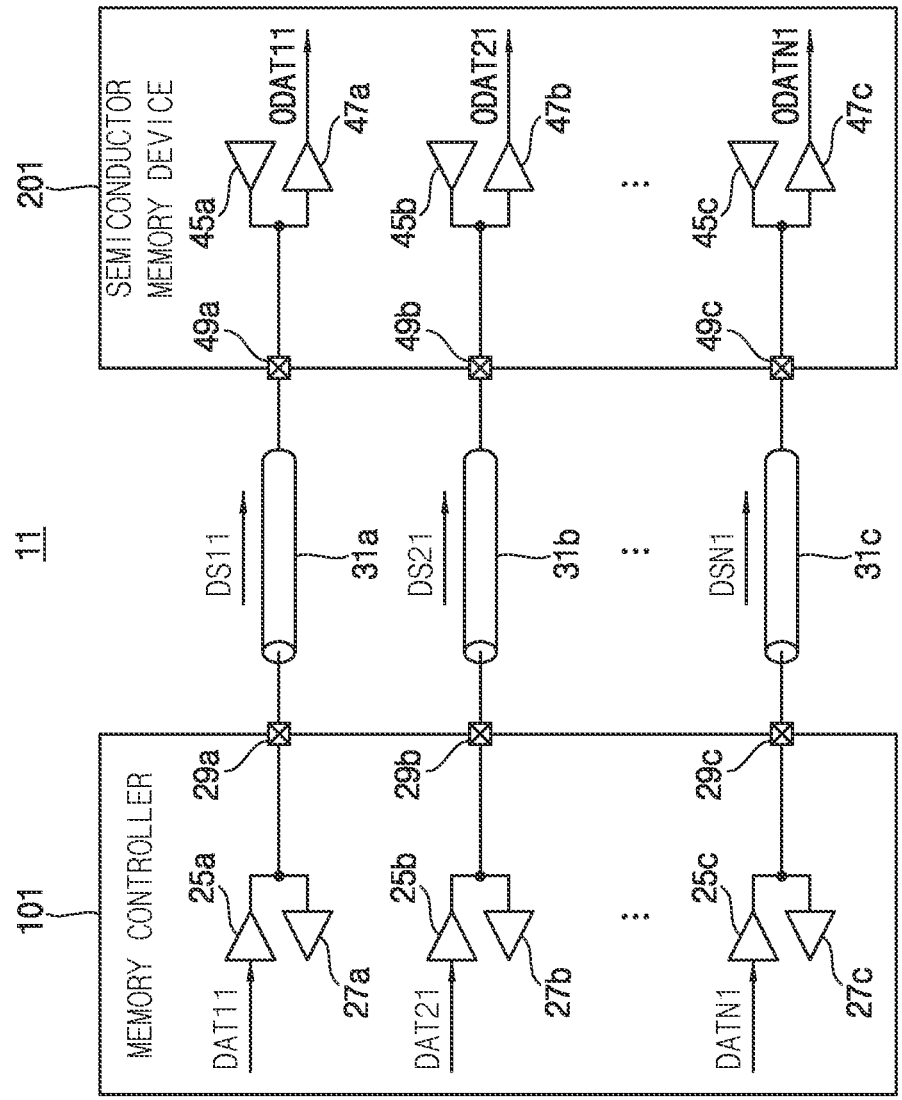
FIGS. 2 and 3 are block diagrams illustrating an example of a memory system of FIG. 1.
Figure 3:
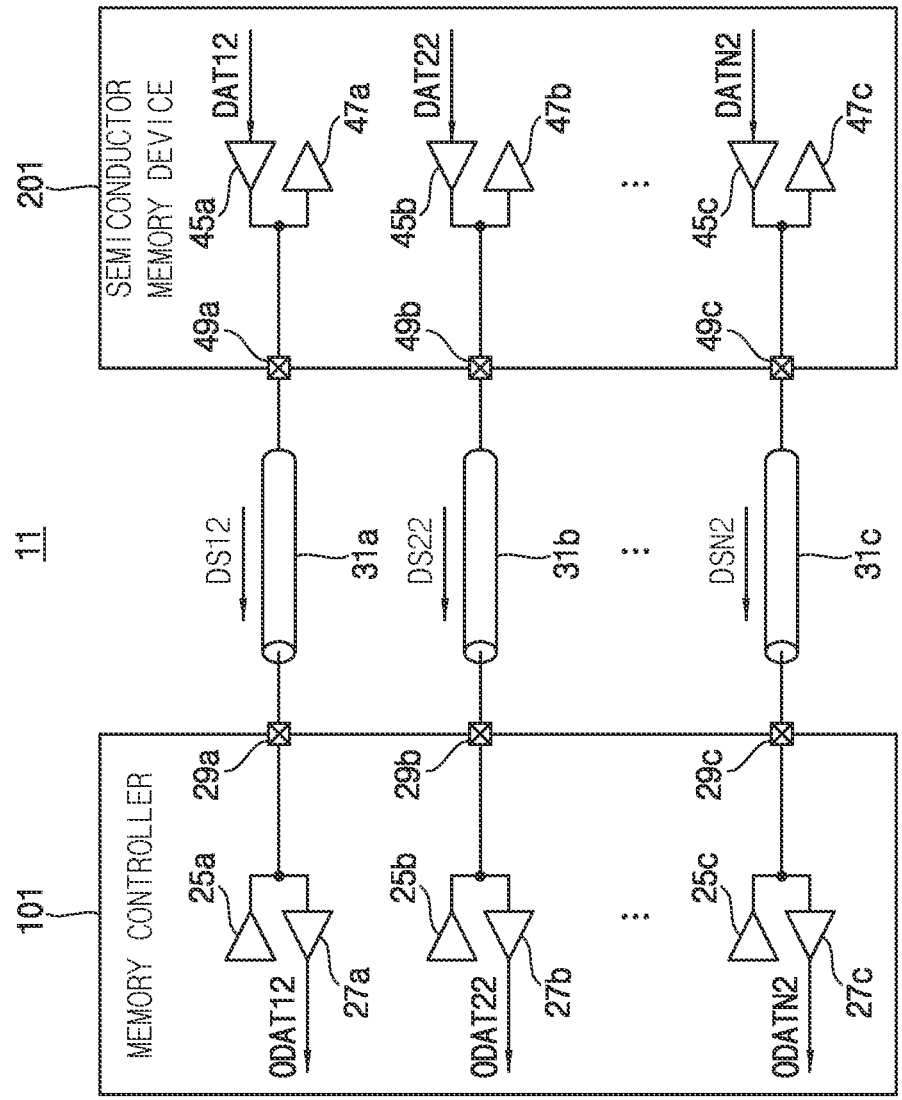

FIGS. 2 and 3 are block diagrams illustrating an example of a memory system of FIG. 1. Referring to FIGS. 2 and 3, a memory system 11 includes a memory controller 101, a semiconductor memory device 201 and a plurality of channels 31a, 31b and 31c. As shown, the memory controller 101 may include a plurality of transmitters 25a, 25b and 25c, a plurality of receivers 27a, 27b and 27c, and a plurality of data I/O pads 29a, 29b and 29c. In addition, the semiconductor memory device 201 may include a plurality of transmitters 45a, 45b and 45c, a plurality of receivers 47a, 47b and 47c, and a plurality of data I/O pads 49a, 49b and 49c.

Each of the plurality of transmitters 25a, 25b, 25c, 45a, 45b and 45c may generate a data signal. Each of the plurality of receivers 27a, 27b, 27c, 47a, 47b and 47c may receive the data signal. The plurality of transmitters 25a, 25b, 25c, 45a, 45b and 45c and the plurality of receivers 27a, 27b, 27c, 47a, 47b and 47c may transmit and receive data signal through the plurality of channels 31a, 31b and 31c. And, each of the plurality of data I/O pads 29a, 29b, 29c, 49a, 49b and 49c may be connected to a respective one of the plurality of transmitters 25a, 25b, 25c, 45a, 45b and 45c and a respective one of the plurality of receivers 27a, 27b, 27c, 47a, 47b and 47c. As shown, the plurality of channels 31a, 31b and 31c may electrically connect the memory controller 201 with the semiconductor memory device 201.

As shown, each of the plurality of channels 31a, 31b and 31c may be connected to a respective one of the plurality of transmitters 25a, 25b and 25c and a respective one of the plurality of receivers 27a, 27b and 27c through a respective one of the plurality of data I/O pads 29a, 29b and 29c. In addition, each of the plurality of channels 31a, 31b and 31c may be connected to a respective one of the plurality of transmitters 45a, 45b and 45c and a respective one of the plurality of receivers 47a, 47b and 47c through a respective one of the plurality of data I/O pads 49a, 49b and 49c. The data signal may be transmitted through each of the plurality of channels 31a, 31b and 31c.

FIG. 2 illustrates an operation of transferring data from the memory controller 101 to the semiconductor memory device 201. For example, the transmitter 25a may generate an output data signal DS11 based on input data DAT11, the output data signal DS11 may be transmitted from the memory controller 21 to the memory device 41 through the channel 31a, and the receiver 47a may receive the output data signal DS11 to obtain data ODAT11 corresponding to the input data DAT11. Similarly, the transmitter 25b may generate an output data signal DS21 based on input data DAT21, the output data signal DS21 may be transmitted to the memory device 41 through the channel 31b, and the receiver 47b may receive the output data signal DS21 to obtain data ODAT21 corresponding to the input data DAT21. The transmitter 25c may generate an output data signal DSN1 based on input data DATN1, the output data signal DSN1 may be transmitted to the semiconductor memory device 201 through the channel 31c, and the receiver 47c may receive the output data signal DSN1 to obtain data ODATN1 corresponding to the input data DATN1. In some embodiments, the input data DAT11, DAT21 and DATN1 may be write data to be written into the semiconductor memory device 201.

FIG. 3 illustrates an operation of transferring data from the semiconductor memory device 201 to the memory controller 101. For example, the transmitter 45a may generate an output data signal DS12 based on input data DAT12, the output data signal DS12 may be transmitted from the memory device 41 to the memory controller 21 through the channel 31a, and the receiver 27a may receive the output data signal DS12 to obtain data ODAT12 corresponding to the input data DAT12. Similarly, the transmitter 45b may generate an output data signal DS22 based on input data DAT22, the output data signal DS22 may be transmitted to the memory controller 21 through the channel 31b, and the receiver 27b may receive the output data signal DS22 to obtain data ODAT22 corresponding to the input data DAT22. The transmitter 45c may generate an output data signal DSN2 based on input data DATN2, the output data signal DSN2 may be transmitted to the memory controller 101 through the channel 31c, and the receiver 27c may receive the output data signal DSN2 to obtain data ODATN2 corresponding to the input data DATN2. In some embodiments, the input data DAT12, DAT22 and DATN2 may be read data retrieved from the semiconductor memory device 201, in response to a read command issued by the memory controller 101.

Figure 4:
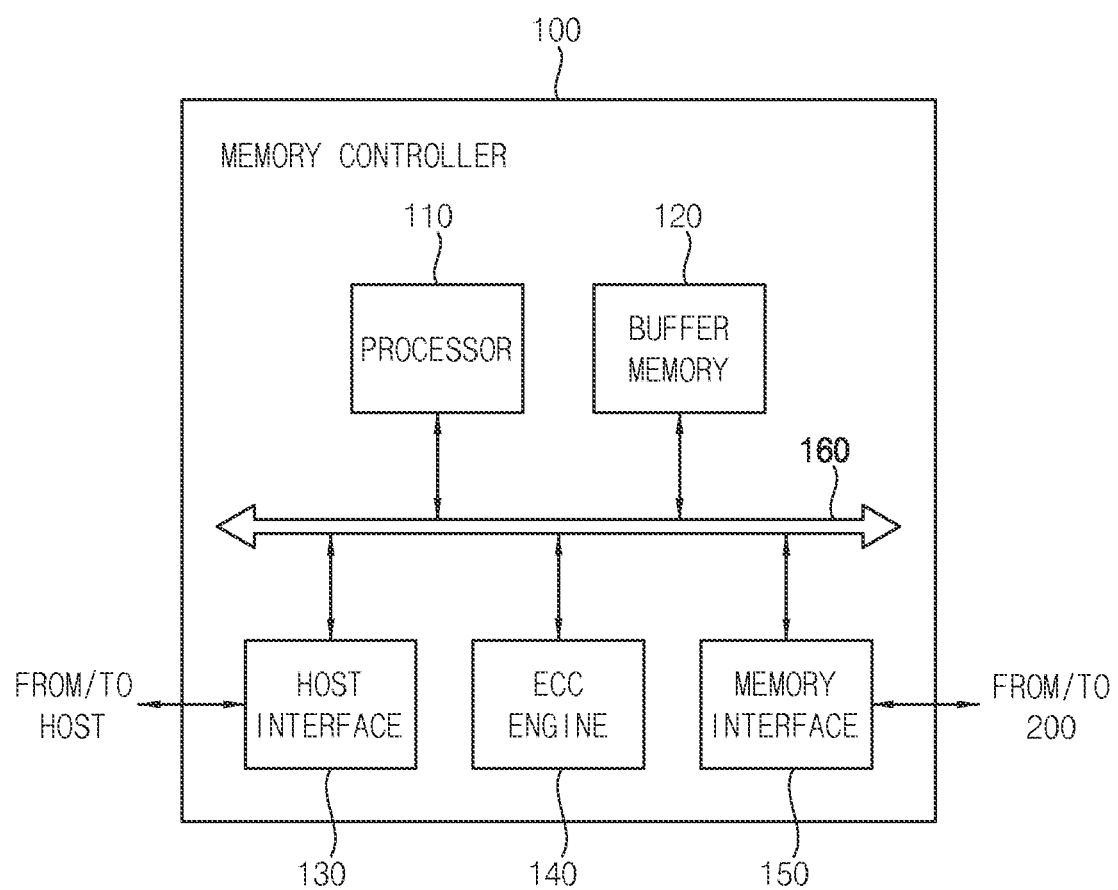
FIG. 4 is a block diagram illustrating an example of a memory controller included in a memory system according to example embodiments.

FIG. 4 is a block diagram illustrating an example of a memory controller included in a memory system according to example embodiments. Referring to FIG. 4, a memory controller 100 may include at least one processor 110, a buffer memory 120, a host interface 130, an error correction code (ECC) engine 140 and a memory interface 150. The processor 110 may control an operation of the memory controller 100 in response to a command and/or request received via the host interface 130 from an external host (not illustrated). For example, the processor 110 may control respective components by employing firmware for operating a semiconductor memory device, such as the semiconductor memory device 200 in FIG. 1. In addition, the buffer memory 120 may store instructions and data executed and processed by the processor 110. As will be understood by those skilled in the art, the buffer memory 120 may be implemented as a volatile memory device, such as a dynamic random access memory (DRAM), a static random access memory (SRAM), a cache memory, or the like.

The host interface 130 may provide physical connections between the host and the memory controller 100. The host interface 130 may provide an interface corresponding to a bus format of the host for communication between the host and the memory controller 100. The ECC engine 140 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The memory interface 150 may exchange data with the semiconductor memory device 200. The memory interface 150 may transmit a command and an address to the semiconductor memory device 200, and may transmit data to the semiconductor memory device 200 or receive data read from the semiconductor memory device 200. Although not illustrated in FIG. 4, a transmitter, such as the transmitter 25a in FIG. 2 that generates the data signal according to example embodiments, and a receiver (e.g., the receiver 27a in FIG. 2) that receives the data signal, may be included in the memory interface 150.

Figure 5:
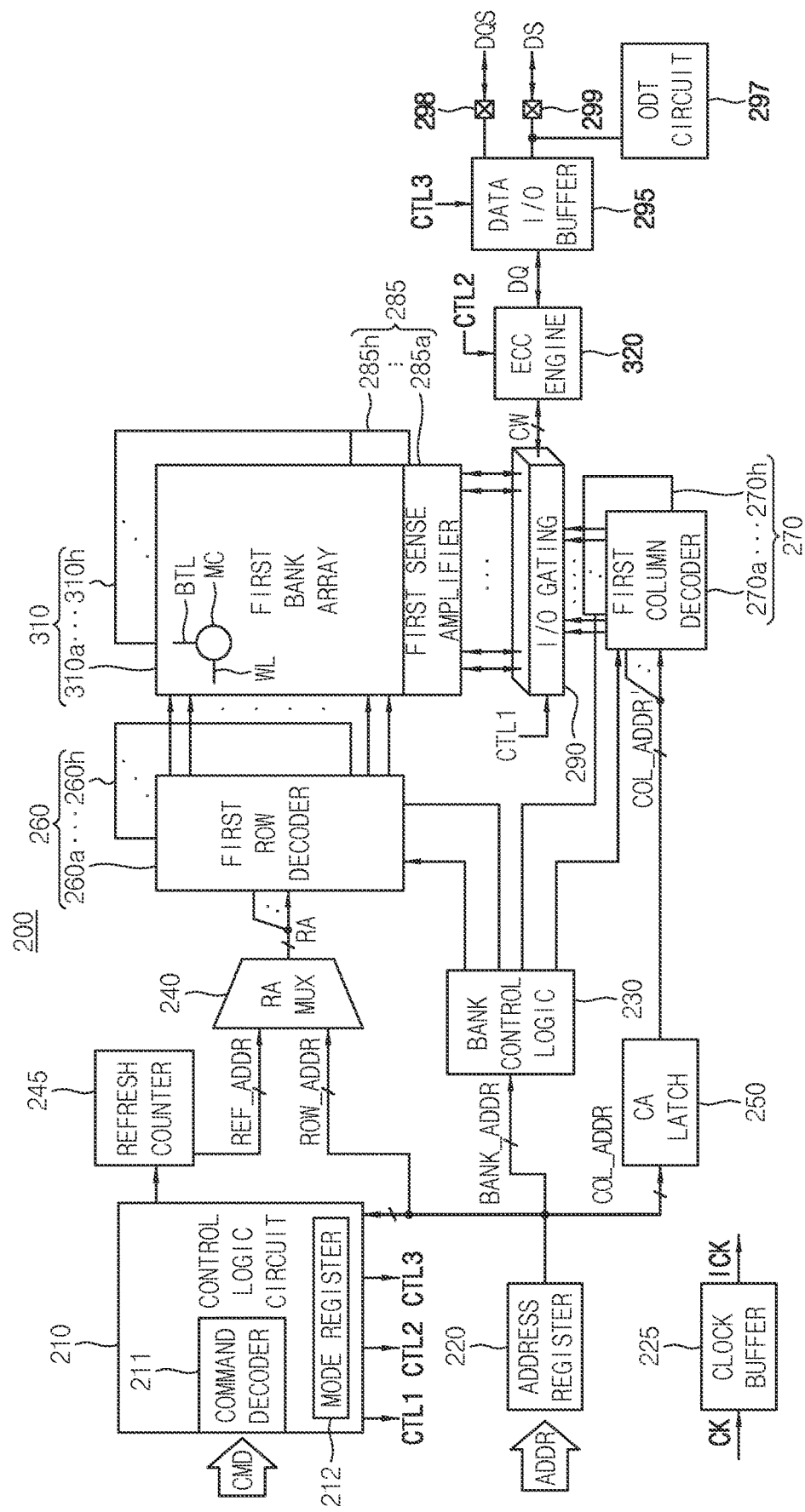
FIG. 5 is a block diagram illustrating an example of the semiconductor memory device included in the memory system of FIG. 1 according to example embodiments.

FIG. 5 is a block diagram illustrating an example of the semiconductor memory device included in the memory system of FIG. 1 according to example embodiments. Referring to FIG. 5, the semiconductor memory device 200 may include a control logic circuit 210, an address register 220, a clock buffer 225, a bank control logic 230, a refresh counter 245, a row address multiplexer 240, a column address latch 250, a row decoder 260, a column decoder 270, a memory cell array 310, a sense amplifier unit 285, an I/O gating circuit 290, an ECC engine 320, an on-die termination (ODT) circuit 297 and a data I/O buffer 295. As described above, the semiconductor memory device 200 may be a volatile memory device, such as a dynamic random access memory (DRAM) device that supports refresh operations to maintain stored data integrity.

The memory cell array 310 may include first through eighth bank arrays 310a~380h. The row decoder 260 may include first through eighth row decoders 260a~260h respectively coupled to the first through eighth bank arrays 310a~380h, the column decoder 270 may include first through eighth column decoders 270a~270h respectively coupled to the first through eighth bank arrays 310a~380h, and the sense amplifier unit 285 may include first through eighth sense amplifiers 285a~285h respectively coupled to the first through eighth bank arrays 310a~380h. The first through eighth bank arrays 310a~380h, the first through eighth row decoders 260a~260h, the first through eighth column decoders 270a~270h and first through eighth sense amplifiers 285a~285h may form first through eighth banks. Each of the first through eighth bank arrays 310a~380h may include a plurality of memory cells MC formed at intersections of a plurality of word-lines WL and a plurality of bit-line BTL.

The address register 220 may receive the address ADDR including a bank address BANK_ADDR, a row address ROW_ADDR and a column address COL_ADDR from the memory controller 100. The address register 220 may provide the received bank address BANK_ADDR to the bank control logic 230, may provide the received row address ROW_ADDR to the row address multiplexer 240, and may provide the received column address COL_ADDR to the column address latch 250. The clock buffer 225 may receive the clock signal CK, may generate an internal clock signal ICK by buffering the clock signal CK, and may provide the internal clock signal ICK to circuit components processing the command CMD and the address ADDR.

The bank control logic 230 may generates bank control signals in response to the bank address BANK_ADDR. One of the first through eighth row decoders 260a~260h corresponding to the bank address BANK_ADDR is activated in response to the bank control signals, and one of the first through eighth column decoders 270a~270h corresponding to the bank address BANK_ADDR is activated in response to the bank control signals.

The row address multiplexer 240 may receive the row address ROW_ADDR from the address register 220, and may receive a refresh row address REF_ADDR from the refresh counter 245. The row address multiplexer 240 may selectively output the row address ROW_ADDR or the refresh row address REF_ADDR as a row address RA. The row address RA that is output from the row address multiplexer 240 may be applied to the first through eighth row decoders 260a~260h. The refresh counter 245 may sequentially increase or decrease the refresh row address REF_ADDR under control of the control logic circuit 210.

The activated one of the first through eighth row decoders 260a~260h, by the bank control logic 230, may decode the row address RA that is output from the row address multiplexer 240, and may activate a word-line corresponding to the row address RA. For example, the activated row decoder may apply a word-line driving voltage to the word-line corresponding to the row address. The column address latch 250 may receive the column address COL_ADDR from the address register 220, and may temporarily store the received column address COL_ADDR. In some embodiments, in a burst mode, the column address latch 250 may generate column addresses COL_ADDR' that increment from the received column address COL_ADDR. The column address latch 250 applies the temporarily stored or generated column address COL_ADDR' to the first through eighth column decoders 270a~270h.

The activated one of the first through eighth column decoders 270a~270h may activate a sense amplifier corresponding to the bank address BANK_ADDR and the column address COL_ADDR through the I/O gating circuit 290. This I/O gating circuit 290 may include circuitry for gating input/output data, and may further include input data mask logic, read data latches for storing data that is output from the first through eighth bank arrays 310a~380h, and write drivers for writing data to the first through eighth bank arrays 310a~380h.

Codeword CW read from one bank array of the first through eighth bank arrays 310a~380h may be sensed by a sense amplifier coupled to the one bank array from which the data is to be read, and may be stored in the read data latches. The codeword CW stored in the read data latches may be provided to the memory controller 100 via the data I/O buffer 295 after ECC decoding is performed on the codeword CW by the ECC engine 320.

A data DQ to be written in one bank array of the first through eighth bank arrays 310a~380h may be provided to the ECC engine 320 from the data I/O buffer 295, the ECC engine 320 may perform an ECC encoding on the data DQ to generate parity bits, the ECC engine 320 may provide the data DQ and the parity bits to the I/O gating circuit 290 and the I/O gating circuit 290 may write the data DQ and the parity bits in a sub-page in one bank array through the write drivers.

The data I/O buffer 295 may convert the data signal DS received from the memory controller 100 to the data DQ and may provide the data DQ to the ECC engine 320 in a write operation of the semiconductor memory device 200. The data I/O buffer 295 may convert the data DQ to the data signal DS and may provide the data signal DS to the memory controller 100 in a read operation of the semiconductor memory device 200. The data I/O buffer 295 may transmit/receive the data signal DS via a data I/O pad 299 and may transmit/receive the data strobe signal DQS via a strobe pad 298.

The data I/O buffer 295 may include a transmitter and a receiver. The receiver may include a decision feedback equalizer. This decision feedback equalizer may include a first stage and a second stage which include a plurality of summers cascade-connected, may generate a compensated data signal by summing a current value of a data signal and feedback signals based on a plurality of selection signals, may generate a sampled signal including a decision value by sampling bits of the compensated data signal based on divided strobe signals, may generate the feedback signals based on weights and the sampled signal corresponding to a previous value of the data signal, may provide a first portion of the feedback signals to the second stage and may provide second portions of the feedback signals to the first stage.

The ECC engine 320 may perform an ECC encoding and an ECC decoding on the data DQ according to a control of the control logic circuit 210. In addition, the control logic circuit 210 may control operations of the semiconductor memory device 200. For example, the control logic circuit 210 may generate control signals for the semiconductor memory device 200 in order to perform a write operation or a read operation. The control logic circuit 210 may include a command decoder 211 that decodes the command CMD received from the memory controller 100 and a mode register 212 that sets an operation mode of the semiconductor memory device 200. For example, the command decoder 211 may generate the control signals corresponding to the command CMD by decoding a write enable signal, a row address strobe signal, a column address strobe signal, a chip select signal, etc. The command decoder 211 (i.e., the control logic circuit 210) may generate a first control signal CTL1 for controlling the I/O gating circuit 290, a second control signal CTL2 for controlling the ECC engine 320 and a third control signal CTL3 for controlling the receiver in the data I/O buffer 295 by decoding the command CMD.

The ODT circuit 297 may be connected to the data I/O pad 299 and the data I/O buffer 295. When the ODT circuit 297 is enabled, the ODT circuit 297 may perform ODT operation. When the ODT operation is performed, signal integrity of any transmitted or received signal may be enhanced by preventing signal reflection due to impedance matching.

Although the semiconductor memory device included in the memory system according to example embodiments is described based on a DRAM, the semiconductor memory device according to example embodiments may be any volatile memory device, and/or any nonvolatile memory device, e.g., a flash memory, a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), etc.

Figure 6:
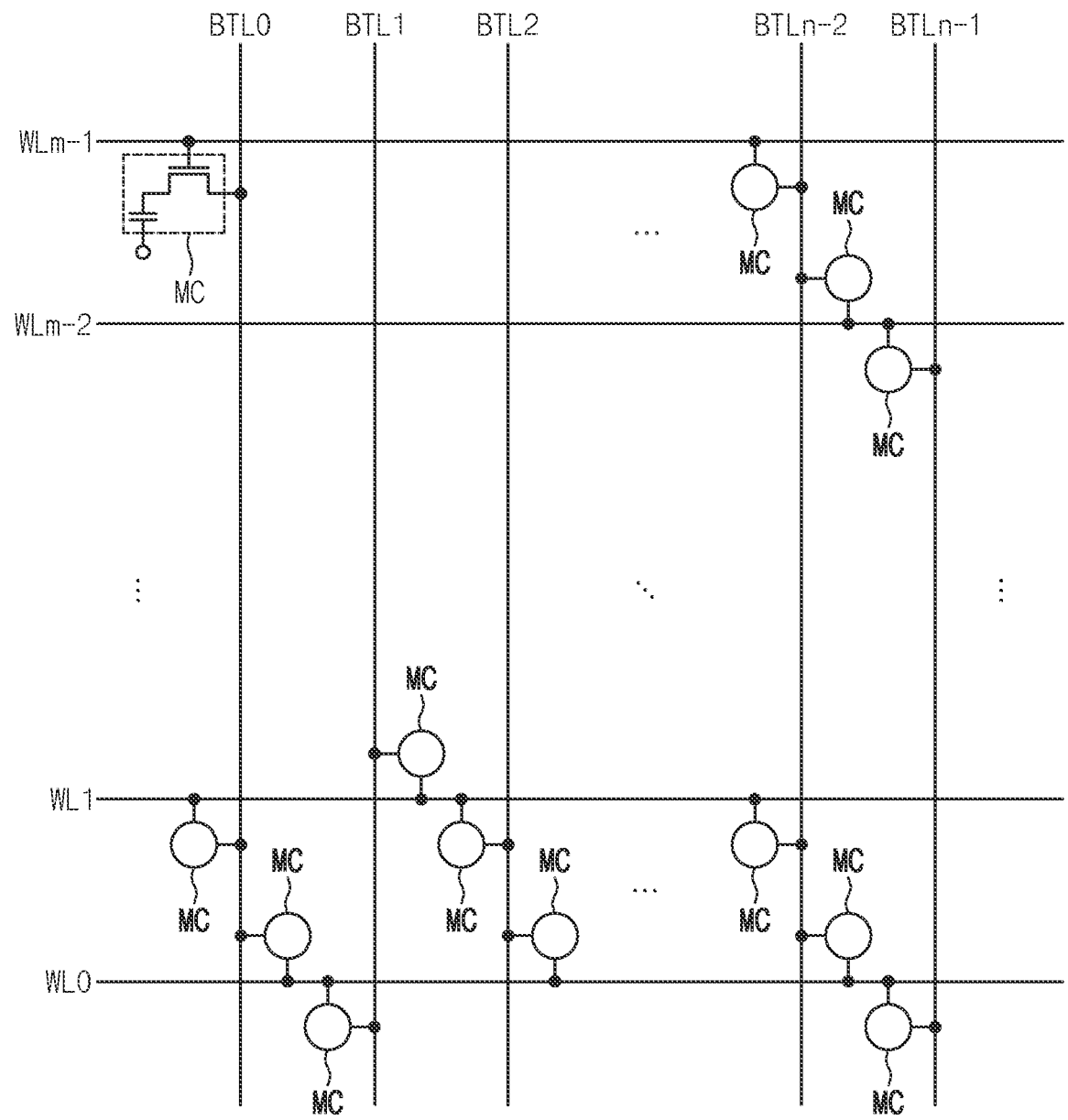
FIG. 6 illustrates an example of the first bank array in the semiconductor memory device of FIG. 5.

FIG. 6 illustrates an example of the first bank array in the semiconductor memory device of FIG. 5. Referring to FIG. 6, the first bank array 310a may include a plurality of word-lines WL0~WLm-1 (m is a natural number greater than two), a plurality of bit-lines BTL0~BTLn-1 (n is a natural number greater than two), and a plurality of memory cells MCs disposed at intersections between the word-lines WL0~WLm-1 and the bit-lines BTL0~BTLn-1. Each of the memory cells MCs includes a cell transistor coupled to each of the word-lines WL0~WLm-1 and each of the bit-lines BTL0~BTLn-1 and a cell capacitor coupled to the cell transistor. Each of the memory cells MCs may have a DRAM cell structure. Each of the word-lines WL0~WLm-1 extends in a first direction DR1 and each of the bit-lines BTL1~BTLn-1 extends in a second direction DR2 crossing the first direction DR1. The word-lines WL0~WLm-1 coupled to the plurality of memory cells MCs may be referred to as rows of the first bank array 310a and the bit-lines BTL0~BTLn-1 coupled to the plurality of memory cells MCs may be referred to as columns of the first bank array 310a.

FIG. 7A is a block diagram illustrating an example of a receiver 400 according to example embodiments. Referring to FIG. 7A, a receiver 400 may include a buffer 410, a decision feedback equalizer 420, a deserializer 490, a divider 480 and a control circuit 500. The buffer 410 may receive the data signal DS and may generate a buffered data signal BDS by comparing the received data signal DS with a reference voltage VREF. The buffer 410 may include a positive input terminal to receive the data signal DS, a negative input terminal to receive the reference voltage VREF and an output terminal to provide the buffered data signal BDS. In alternative embodiments, the receiver 400 may not include the buffer 410. When the receiver 400 does not include the buffer 410, the decision feedback equalizer 420 may directly receive the data signal DS.

The decision feedback equalizer 420 may include a multi-stage summer circuit 430, a sampling circuit 440 and a feedback circuit FC 450. The multi-stage summer circuit 430 may include the first stage 430a and the second stage 430b that are cascade-connected. The first stage 430a and the second stage 430b, which include a plurality of summation devices (a/k/a "summers") that are cascade-connected, may collectively generate a compensated data signal CDS1 by summing a current value of the data signal DS and feedback signals FS11, FS12, FS13 and FS14 by a time division scheme based on a plurality of selection signals SELI, SELIB, SELQ and SELQB, may generate a sampled signal SDS1 including a decision value by sampling bits of the compensated data signal CDS1 based on divided strobe signals DQS_2N, may generate the feedback signals FS11, FS12, FS13 and FS14 based on weights WC1, WC2, WC3 and WC4 and the sampled signal SDS1 corresponding to a previous value of the data signal DS, may provide a first portion FS11 of the feedback signals FS11, FS12, FS13 and FS14 to the second stage 430b and may provide second portions FS12, FS13 and FS14 of the feedback signals FS11, FS12, FS13 and FS14 to the first stage 430a.

In addition, the first stage 430a may generate a first internal data signal IDS1 and a second internal data signal IDS2 based on the data signal DS and the second portions FS12, FS13 and FS14 of the feedback signals FS11, FS12, FS13 and FS14. The second stage 430b may generate the compensated data signal CDS1 based on the first internal data signal IDS1, the second internal data signal IDS2 and the first portion FS11 of the feedback signals FS11, FS12, FS13 and FS14.

The sampling circuit 440 may generate bits of the sampled signal SDS1 by sampling bits of the compensated data CDS1 based on the divided strobe signals DQS_2N and may provide the sampled signal SDS1 to the deserializer 490. The sampled signal SDS1 may include a decision value associated with the data signal DS.

In addition, the feedback circuit 450 may generate the feedback signals FS11, FS12, FS13 and FS14 by multiplying the sampled signal SDS1 and delayed sampled signals with the weights WC1, WC2, WC3 and WC4, respectively, and may provide the feedback signal FS11 to the second stage 430b and may provide the feedback signals FS12, FS13 and FS14 to the first stage 430a. The delayed sampled signals may be obtained by delaying the sampled signal SDS1 sequentially.

The deserializer 490 may generate a deserialized data DQ by deserializing the sampled signal SDS1. The deserialized data DQ may be referred to as an output data. The divider 480 may generate a first divided strobe signal DQS_2N_0, a second divided strobe signal DQS_2N_90, a third divided strobe signal DQS_2N_180 and a fourth divided strobe signal DQS_2N_270 which have a phase difference of 90 degrees with respect to each other based on the data strobe signal DQS including a first strobe signal DQS0 and a second strobe signal DQS180 which have a phase difference of 180 degrees and may provide the decision feedback equalizer 420 with the divided strobe signals DQS_2N that include the first divided strobe signal DQS_2N_0, the second divided strobe signal DQS_2N_90, the third divided strobe signal DQS_2N_180 and the fourth divided strobe signal DQS_2N_270.

The control circuit 500 may generate the plurality of selection signals SELI, SELIB, SELQ and SELQB and may provide the plurality of selection signals SELI, SELIB, SELQ and SELQB to the second stage 430b of the decision feedback equalizer 420. The control circuit 500 may generate the weights WC1, WC2, WC3 and WC4 and may provide the weights WC1, WC2, WC3 and WC4 to the feedback circuit 450 of the decision feedback equalizer 420.

As described above, within the decision feedback equalizer 420, the summers are divided into the first stage 430a and the second stage 430b, which are cascade-connected, and the feedback circuit 450 provides the feedback signal FS11 to the second stage 430b and provides the feedback signals FS12, FS13 and FS14 to the first stage 430a. Based on this configuration, a critical path and a non-critical path are separated from each other, so that the decision feedback equalizer 420 can operate with high speed. In addition, the summers in the second stage 430 generates the bits of the compensated data signal CDS1 by operating based on time division scheme, in response to the plurality of selection signals SELI, SELIB, SELQ and SELQB, and thus power consumption may be reduced. In addition, the decision feedback equalizer 420 may including a cascaded arrangement of a first stage (for example, the first stage 430a) having at least one summation circuit therein and a second stage (for example, the second stage 430b) having a plurality of summation circuits therein. The decision feedback equalizer 420 may generate a compensated data signal CDS1 by summing an attribute of a data signal DS with at least one feedback signal (for example at least one of FS11, FS12, FS13 and FS14), in response to at least one selection signal (for example, at least one of SELI, SELIB, SELQ and SELQB), may generate a sampled signal SDS1 by sampling bits of the compensated data signal CDS1, in response to a plurality of divided strobe signals DQS_2N, and may generate the at least one feedback signal in response to at least one weight (for example at least one of WC1, WC2, WC3 and WC4), the sampled signal SDS1, and at least one delayed version of the sampled signal.

Figure 7B:
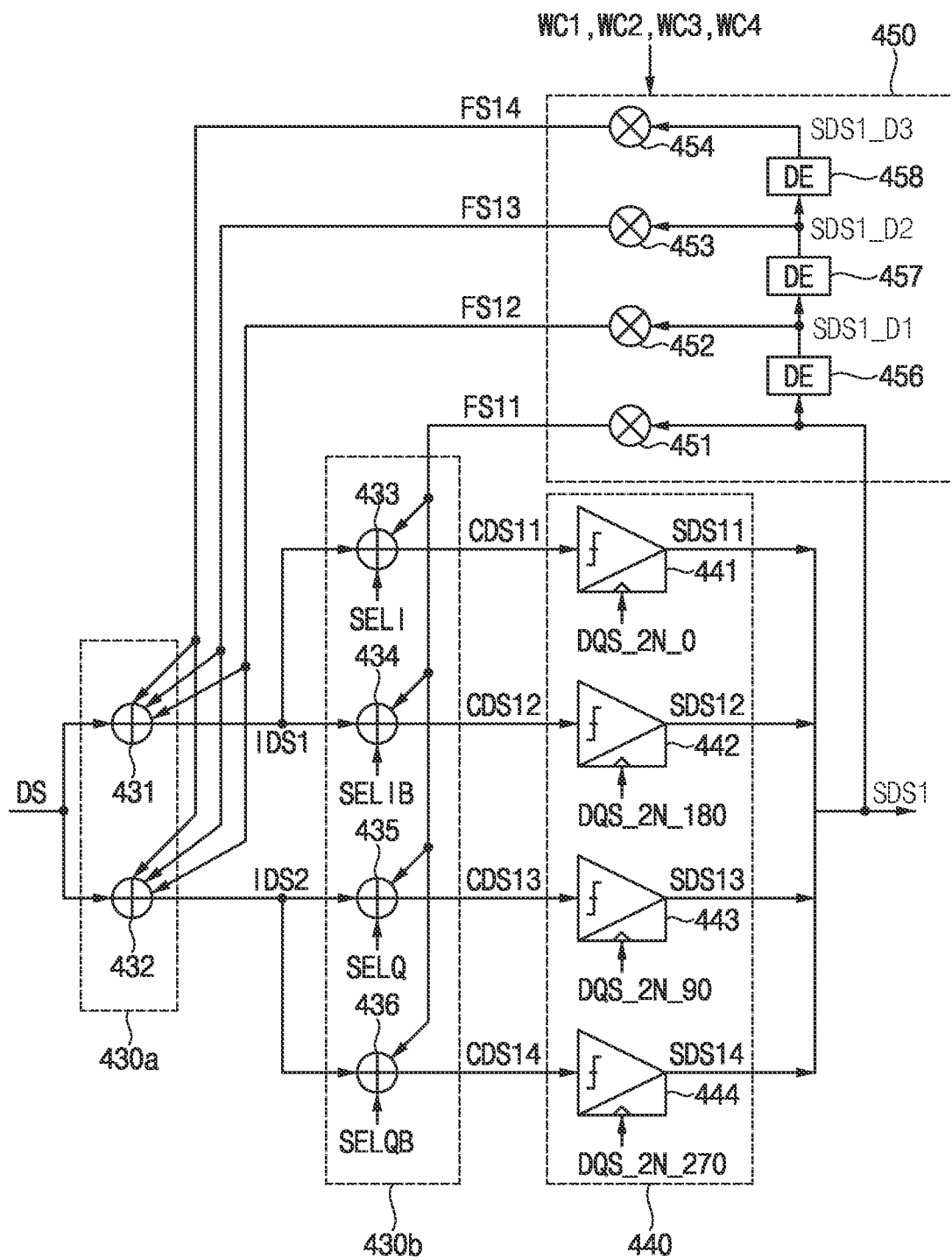
FIG. 7B is a circuit diagram illustrating an example of the decision feedback equalizer in the receiver of FIG. 7A according to example embodiments.

FIG. 7B is a circuit diagram illustrating an example embodiment of the decision feedback equalizer 420 that may be utilized within the receiver of FIG. 7A. In FIG. 7B, the plurality of selection signals SELI, SELQ, SELIB and SELQB are referred to as a first selection signal, a second selection signal, a third selection signal and a fourth selection signal, respectively, and the feedback signals FS11, FS12, FS13 and FS14 are referred to as a first feedback signal, a second feedback signal, a third feedback signal and a fourth feedback signal. The first stage 430a may include a first summer 431 and a second summer 432, and the second stage 430b may include a third summer 433, a fourth summer 434, a fifth summer 435 and a sixth summer 436. As described above, these "summers" may operate as summation devices having multiple inputs that are configured to receive corresponding signals to be summed.

The first summer 431 (within the first stage 430a) may generate the first internal data signal IDS1 by summing the data signal DS with the second, third and fourth feedback signals FS12, FS13 and FS14. The second summer 432 (within the first stage 430a) may generate the second internal data signal IDS2 by summing the data signal DS with the second, third and fourth feedback signals FS12, FS13 and FS14. Based on this illustrated configuration, the first and second internal data signals IDS1, IDS2 will be equivalent signals.

The third summer 433 (within the second stage 430b) may generate a first bit CDS11 of the compensated data signal CDS1 by summing the first internal data signal IDS1 with the first feedback signal FS11, in response to the first selection signal SELI, during a first time interval. In contrast, the fourth summer 434 (within the second stage 430b) may generate a second bit CDS12 of the compensated data signal CDS by summing the first internal data signal IDS1 with the first feedback signal FS11, in response to the third selection signal SELIB, during a third time internal not overlapping with the first time interval. In the illustrated embodiment, the first and third selection signals SELI, SELIB may be complementary signals.

The fifth summer 435 (within the second stage 430b) may generate a third bit CDS13 of the compensated data signal CDS3 by summing the second internal data signal IDS2 with the first feedback signal FS11, in response to the second selection signal SELQ, during a second time interval. In contrast, the sixth summer 436 may generate a fourth bit CDS14 of the compensated data signal CDS1 by summing the second internal data signal IDS2 with the first feedback signal FS11, in response to the fourth selection signal SELQB, during a fourth time interval not overlapping with the second time interval. In the illustrated embodiment, the second and fourth selection signals SELQ, SELQB may be complementary signals.

Referring still to FIG. 7B, the sampling circuit 440 may include a first slicer 441, a second slicer 442, a third slicer 443 and a fourth slicer 444. As shown, the first slicer 441 may generate a first bit SDS11 of the sampled signal SDS1 by sampling the first bit CDS11 of the compensated data signal CDS1 based on the first divided strobe signal DQS_2N_0. The second slicer 442 may generate a second bit SDS12 of the sampled signal SDS1 by sampling the second bit CDS12 of the compensated data signal CDS1 based on the third divided strobe signal DQS_2N_180, which may be 180° out-of-phase relative to the first divided strobe signal DQS_2N_0.

The third slicer 443 may generate a third bit SDS13 of the sampled signal SDS1 by sampling the third bit CDS13 of the compensated data signal CDS1 based on the second divided strobe signal DQS_2N_90, which may be 90° out-of-phase relative to the first divided strobe signal DQS_2N_0. Finally, the fourth slicer 444 may generate a fourth bit SDS14 of the sampled signal SDS1 by sampling the fourth bit CDS14 of the compensated data signal CDS1 based on the fourth divided strobe signal DQS_2N_270, which may be 270° out-of-phase relative to the first divided strobe signal DQS_2N_0.

Next, the feedback circuit 450 may include a first tap 451, a second tap 452, a third tap 453, a fourth tap 454, a first delay element DE 456, a second delay element 457 and a third delay element 458. The first tap 451 may generate the first feedback signal FS11 by multiplying the sampled signal SDS1 with the first weight WC1, and may provide the first feedback signal FS11 to the third through sixth summers 433-436.

The first delay element 456 may output a first delayed sampled signal SDS1_D1 by delaying the sampled signal SDS1. The second tap 452 may generate the second feedback signal FS12 by multiplying the first delayed sampled signal SDS1_D1 with the second weight WC2, and may provide the second feedback signal FS12 to the first and second summers 431, 432. Similarly, the second delay element 457 may output a second delayed sampled signal SDS1_D2 by further delaying the first delayed sampled signal SDS1_D1. The third tap 453 may generate the third feedback signal FS13 by multiplying the second delayed sampled signal SDS1_D2 with the third weight WC3, and may provide the third feedback signal FS13 to the first and second summers 431, 432. Finally, the third delay element 458 may output a third delayed sampled signal SDS1_D3 by further delaying the second delayed sampled signal SDS1_D2. The fourth tap 454 may generate the fourth feedback signal FS14 by multiplying the third delayed sampled signal SDS1_D3 with the fourth weight WC4, and may provide the fourth feedback signal FS14 to the first and second summers 431, 432.

FIG. 8A illustrates a first portion 420aa of the decision feedback equalizer 420 of FIG. 7B according to example embodiments, which includes the first summer 431, the third summer 433, the fourth summer 434 and a load circuit 460aa. As shown, the load circuit 460aa may include a first resistor R11, a second resistor R12, a third resistor R13 and a fourth resistor R14 which are connected in parallel to a power supply voltage VDDQ.

The first summer 431 may include a pair of n-channel metal-oxide semiconductor (NMOS) transistors 431a and 431b and a current source 431c, which is electrically coupled to source terminals of the NMOS transistors 431a, 431b. As shown, the NMOS transistor 431a may be coupled between a first node N11 and a seventh node N17 and may have a gate receiving the data signal DS. In contrast, the NMOS transistors 431b may be coupled between a second node N12 and the seventh node N17 and may have a gate receiving an inverted data signal DSB. The current source 431c may be coupled between the seventh node N17 and a ground voltage VSSQ and may provide a constant "pull-down" current to the seventh node N17. In addition, the second tap 452, the third tap 453 and the fourth tap 454 may be connected to the first node N11 and the second node N12.

The third summer 433 may include first and second NMOS transistors 433a and 433b. The first NMOS transistor 433a may be coupled to the first summer 431 at the first node N11, may be coupled to the first resistor R11 and the first tap 451 at a third node N13 and may have a gate receiving the first selection signal SELI. The second NMOS transistor 433b may be coupled to the first summer 431 at the second node N12, may be coupled to the second resistor R12 and the first tap 451 at a fourth node N14 and may have a gate receiving the first selection signal SELI.

The first NMOS transistor 433a and the second NMOS transistor 433b may connect the first node N11 and the second node N12 to the third node N13 and the fourth node N14, respectively, during the first time interval in which the first selection signal SELI is activated. The first slicer 441 may having input terminals connected to the third node N13 and the fourth node N14 and may output the first bit SDS11 of the sampled signal SDS1 by sampling voltage levels of the third node N13 and the fourth node N14 based on the first divided strobe signal DQS_2N_0.

The fourth summer 434 may include third and fourth NMOS transistors 434a and 434b. The third NMOS transistor 434a may be coupled to the first summer 431 at the second node N12, may be coupled to the fourth resistor R14 and the first tap 451 at a fifth node N15 and may have a gate receiving the third selection signal SELIB. The fourth NMOS transistor 434b may be coupled to the first summer 431 at the first node N11, may be coupled to the third resistor R13 and the first tap 451 at a sixth node N16 and may have a gate receiving the third selection signal SELIB.

The third NMOS transistor 434a and the fourth NMOS transistor 434b may connect the second node N12 and the first node N11 to the fifth node N15 and the sixth node N16, respectively, during the third time interval in which the third selection signal SELIB is activated. The second slicer 442 may have input terminals connected to the sixth node N16 and the fifth node N15 and may output the second bit SDS12 of the sampled signal SDS1 by sampling voltage levels of the sixth node N16 and the fifth node N15 based on the third divided strobe signal DQS_2N_180.

Although not wishing to be bound by any theory of operation, a first time constant τ1 of the first node N11 may be represented as (C11+C12)/gm, where gm represents a conductance of the first node N11, C11 represents a capacitance of the first summer 431 and C12 represents a capacitance of the second tap 452, the third tap 453 and the fourth tap 454. Similarly, a second time constant τ2 of the fourth node N14 may be represented as (R)×(C21+C22+C23), where R represents a resistance of the second resistor R12, C21 represents a capacitance of the second NMOS transistor 433b, C22 represents a capacitance of the first tap 451 and the C23 represents a capacitance of the first slicer 441. Because the second time constant τ2 is associated with the capacitance of the first tap instead of capacitances of the first through fourth taps 451, 452, 453 and 454, a value of the second time constant τ2 may be reduced and the decision feedback equalizer 420aa may advantageously operate with higher speed.

Figure 8B:
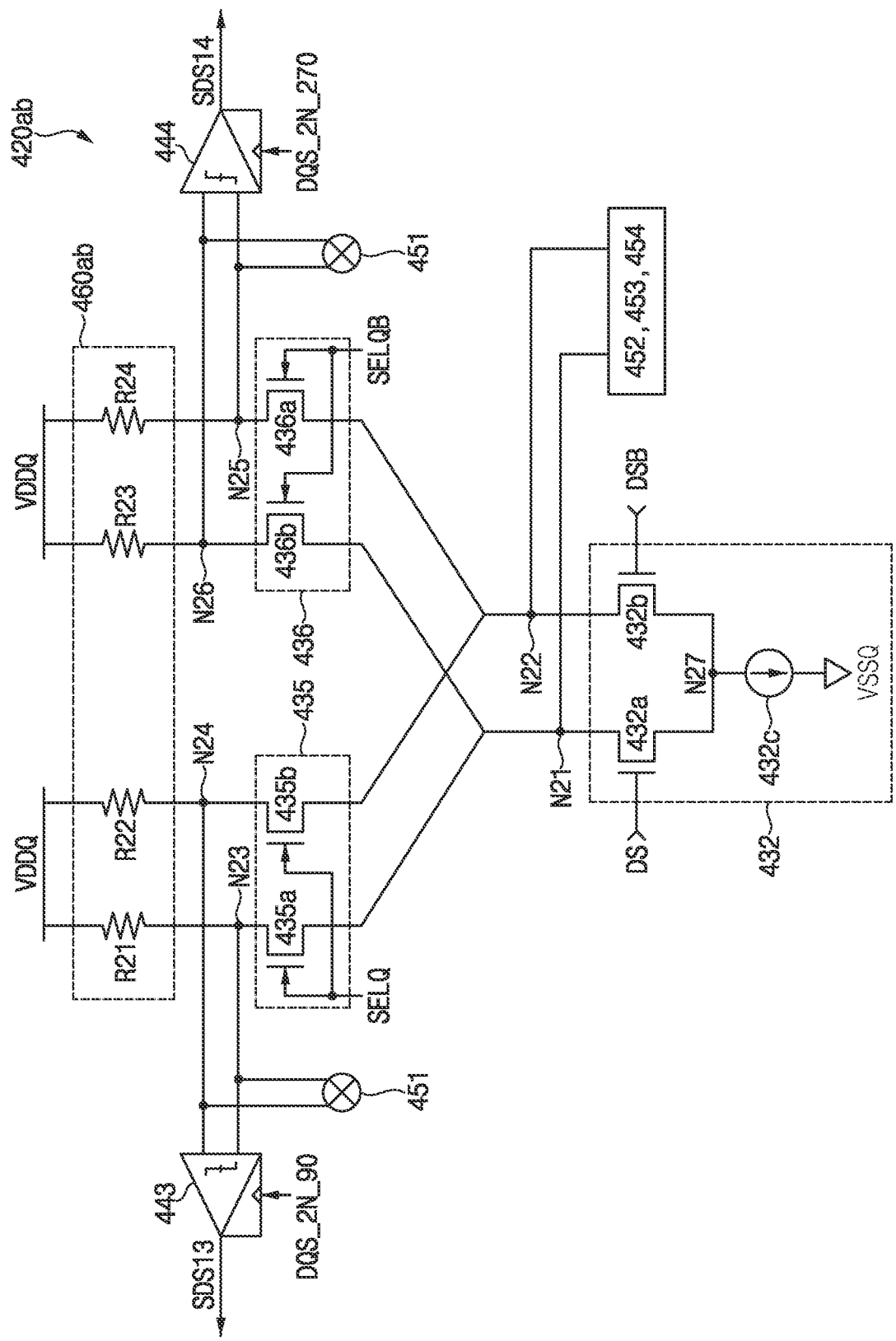
FIG. 8B illustrates a second portion of the decision feedback equalizer of FIG. 7B according to example embodiments.

FIG. 8B illustrates a second portion 420ab of the decision feedback equalizer 420 of FIG. 7B, which may include the second summer 432, the fifth summer 435, the sixth summer 436 and a load circuit 460ab. As shown, the load circuit 460ab may include a first resistor R21, a second resistor R22, a third resistor R23 and a fourth resistor R24 which are connected in parallel to the power supply voltage VDDQ.

The second summer 432 may include NMOS transistors 432a and 432b and a "pull-down" current source 432c. The NMOS transistors 432a may be coupled between a first node N21 and a seventh node N27 and may have a gate receiving the data signal DS. The NMOS transistors 432b may be coupled between a second node N22 and the seventh node N27 and may have a gate receiving an inverted data signal DSB. The current source 432c may be coupled between the seventh node N27 and the ground voltage VSSQ and may provide a constant "pull-down" current to the seventh node N27. The second tap 452, the third tap 453 and the fourth tap 454 may be connected to the first node N21 and the second node N22.

The fifth summer 435 may include first and second NMOS transistors 435a and 435b. The first NMOS transistor 435a may be coupled to the second summer 432 at the first node N21, may be coupled to the first resistor R21 and the first tap 451 at a third node N23, and may have a gate receiving the second selection signal SELQ. The second NMOS transistor 435b may be coupled to the second summer 432 at the second node N22, may be coupled to the second resistor R22 and the first tap 451 at a fourth node N24, and may have a gate receiving the second selection signal SELQ.

The first NMOS transistor 435a and the second NMOS transistor 435b may connect the first node N21 and the second node N22 to the third node N23 and the fourth node N24, respectively, during the second time interval in which the second selection signal SELQ is activated. In addition, the third slicer 443 may be connected to the third node N23 and the fourth node N24 and may output the third bit SDS13 of the sampled signal SDS1 by sampling voltage levels of the third node N23 and the fourth node N24 based on the second divided strobe signal DQS_2N_90.

The sixth summer 436 may include third and fourth NMOS transistors 436a, 436b. The third NMOS transistor 436a may be coupled to the second summer 432 at the second node N22, may be coupled to the fourth resistor R24 and the first tap 451 at a fifth node N25, and may have a gate receiving the fourth selection signal SELQB. The fourth NMOS transistor 436b may be coupled to the first summer 431 at the first node N21, may be coupled to the third resistor R23 and the first tap 451 at a sixth node N26, and may have a gate receiving the fourth selection signal SELQB.

The fourth NMOS transistor 436a and the fourth NMOS transistor 436b may connect the second node N22 and the first node N21 to the fifth node N25 and the sixth node N26, respectively, during the fourth time interval in which the fourth selection signal SEQIB is activated. The fourth slicer 444 may be connected to the sixth node N26 and the fifth node N25 and may output the fourth bit SDS14 of the sampled signal SDS1 by sampling voltage levels of the sixth node N26 and the fifth node N25 based on the fourth divided strobe signal DQS_2N_270.

As described above with respect to FIGS. 8A and 8B, each of the first summer 431, the third summer 433 and the fourth summer 434 is configured symmetrically with respective one of the second summer 432, the fifth summer 435 and the sixth summer 436.

Figure 9A:
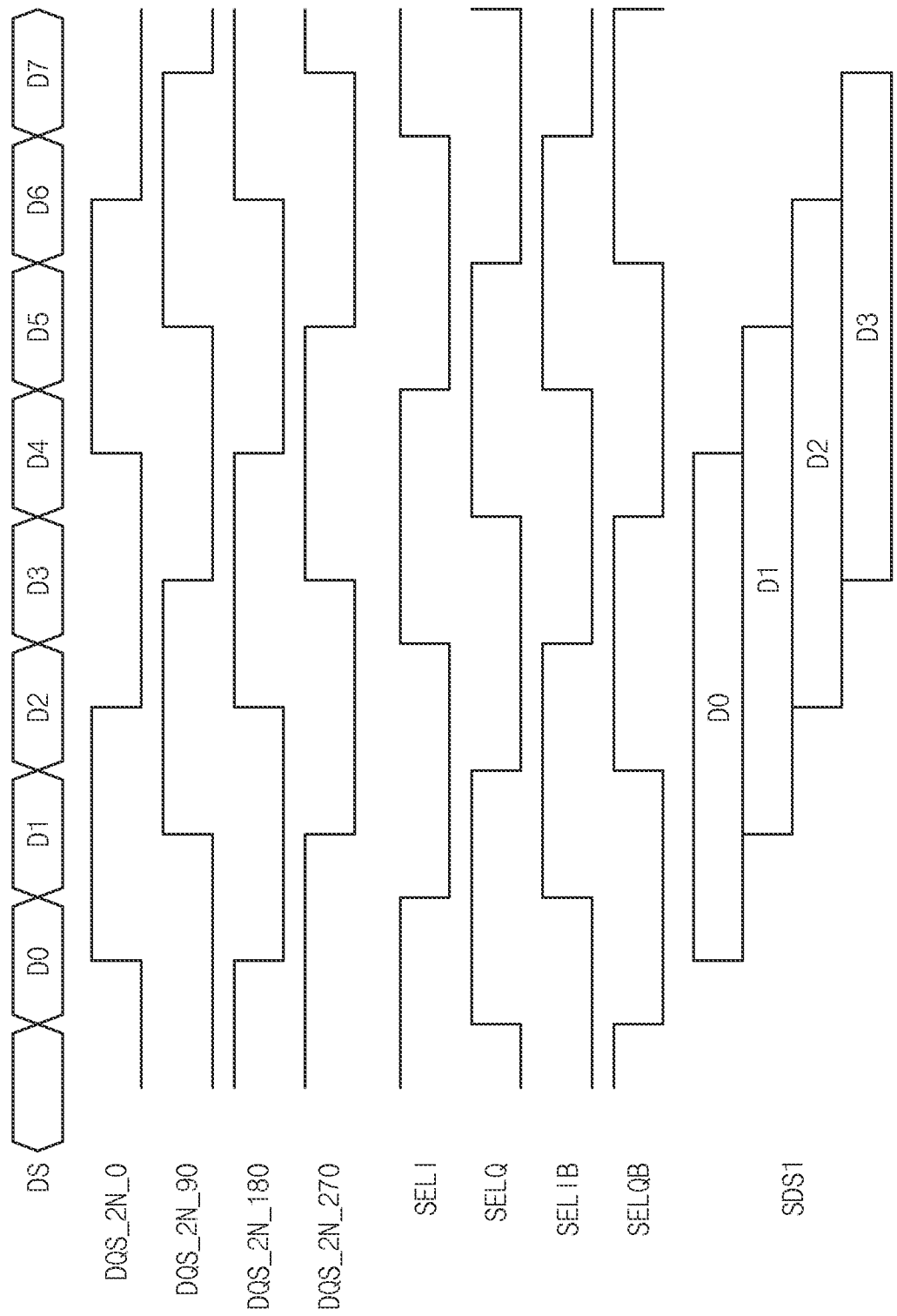
FIG. 9A is a timing diagram illustrating examples of the data signal, the selection signals and the divided strobe signals in FIG. 7A through 8B.

FIG. 9A is a timing diagram illustrating examples of the data signal, the selection signals and the divided strobe signals in FIG. 7A through 8B. Referring to FIGS. 7A through 9A: (i) the first slicer 441 may sample a first bit D0 of the data signal DS at a rising edge of the first divided strobe signal DQS_2N_0 (i.e., when DQS_2N_0 becomes active) during the first time interval in which the first selection signal SELI is activated (i.e., active) as well, (ii) the second slicer 442 may sample a third bit D2 of the data signal DS at a rising edge of the third divided strobe signal DQS_2N_180 during the third time interval in which the third selection signal SELIB is active, (iii) the third slicer 443 may sample a second bit D1 of the data signal DS at a rising edge of the second divided strobe signal DQS_2N_90 during the second time interval in which the second selection signal SELQ is active, and (iv) the fourth slicer 444 may sample a fourth bit D3 of the data signal DS at a rising edge of the fourth divided strobe signal DQS_2N_270 during the fourth time interval in which the fourth selection signal SELQB is active.

FIG. 9B is a timing diagram illustrating examples of the data signal, the selection signals and the compensated data signal in FIG. 7A through 8B. Referring to FIGS. 7A through 8B and 9B, (i) the third summer 433 may outputs the first bit CDS11 of the compensated data signal CDS1 during the first time interval in which the first selection signal SELI is activated, (ii) the fourth summer 434 may outputs the second bit CDS12 of the compensated data signal CDS1 during the third time interval in which the third selection signal SELIB is activated, (iii) the fifth summer 435 may outputs the third bit CDS13 of the compensated data signal CDS1 during the second time interval in which the second selection signal SELQ is activated, and (iv) the sixth summer 436 may outputs the fourth bit CDS14 of the compensated data signal CDS1 during the fourth time interval in which the fourth selection signal SELQB is activated.

Figure 10A:
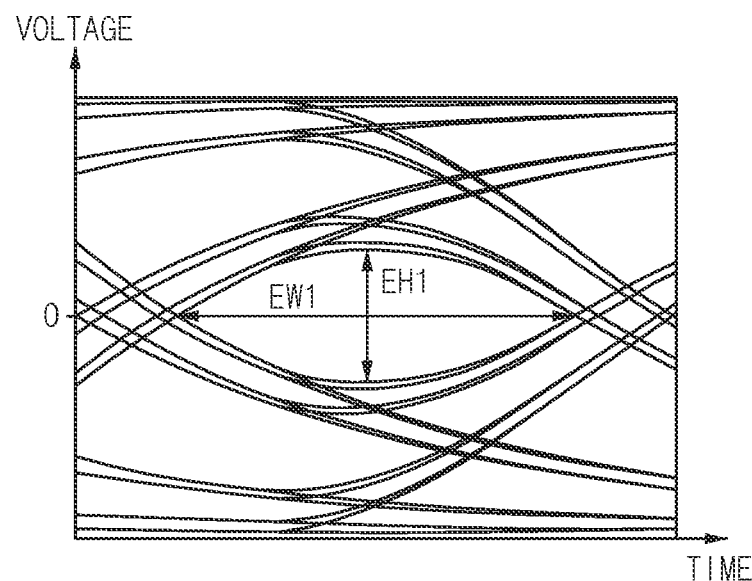
FIG. 10A illustrates an eye diagram of a data signal input to the decision feedback equalizer of FIG. 7A.
Figure 10B:
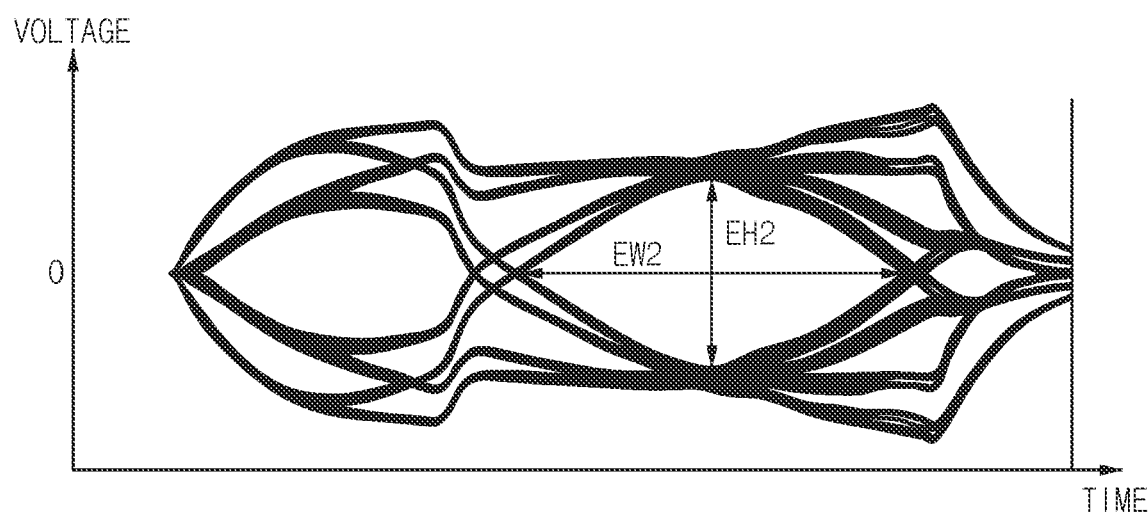
FIG. 10B illustrates an eye diagram of a compensated data signal output from the third summer and the fourth summer in FIG. 7B.

FIG. 10A illustrates an eye diagram of a data signal input to the decision feedback equalizer of FIG. 7A and FIG. 10B illustrates an eye diagram of a compensated data signal output from the third summer and the fourth summer in FIG. 7B. In particular, FIG. 10B illustrates a value obtained by subtracting the second bit CSD12 of the compensated data signal CDS1, output from the fourth summer 434, from the first bit CSD11 of the compensated data signal CDS1, output from the third summer 433.

Referring to FIGS. 10A and 10B, an eye diagram of the data signal DS, which has a first eye width EW1 and a first eye height EH1 is output as an eye diagram of the compensated data signal, which has a second eye width EW2 and a second eye height EH2. According to some embodiments, the second eye width EW2 is greater than the first eye width EW1 and the second eye height EH2 is greater than the first eye height EH1.

FIG. 11A illustrates a first portion of the decision feedback equalizer of FIG. 7B according to example embodiments. Referring to FIG. 11A, a first portion of a decision feedback equalizer 420ba may include the first summer 431, the third summer 433, the fourth summer 434 and a load circuit 460ba. As shown, the decision feedback equalizer 420ba of FIG. 11A is different from the decision feedback equalizer 420aa of FIG. 8A in that the decision feedback equalizer 420ba includes the load circuit 460ba instead of the load circuit 460aa, and description repeated with respect to FIG. 8A will be omitted.

The load circuit 460ba may include a first p-channel metal-oxide semiconductor (PMOS) transistor 461, a second PMOS transistor 462, a third PMOS transistor 463 and a fourth PMOS transistor 464 which are connected in parallel to the power supply voltage VDDQ. As shown, the first PMOS transistor 461 may be coupled between the power supply voltage VDDQ and the third node N13 and may have a gate receiving the third selection signal SELIB. The second PMOS transistor 462 may be coupled between the power supply voltage VDDQ and the fourth node N14 and may have a gate receiving the third selection signal SELIB.

The third PMOS transistor 463 may be coupled between the power supply voltage VDDQ and the fifth node N15 and may have a gate receiving the first selection signal SELI. The fourth PMOS transistor 464 may be coupled between the power supply voltage VDDQ and the sixth node N16 and may have a gate receiving the first selection signal SELI.

The first PMOS transistor 461 and the second PMOS transistor 462 may provide the third node N13 and the fourth node N14 with a current based on the power supply voltage VDDQ, respectively, during the first time interval in which the third selection signal SELIB is deactivated, and may hold voltage levels of the third node N13 and the fourth node N14 during the third time interval in which the third selection signal SELIB is activated.

The third PMOS transistor 463 and the third PMOS transistor 464 may provide the fifth node N15 and the sixth node N16 with a current based on the power supply voltage VDDQ, respectively, during the third time interval in which the first selection signal SELI is deactivated, and may hold voltage levels of the fifth node N15 and the sixth node N16 during the first time interval in which the first selection signal SELI is activated.

Figure 11B:
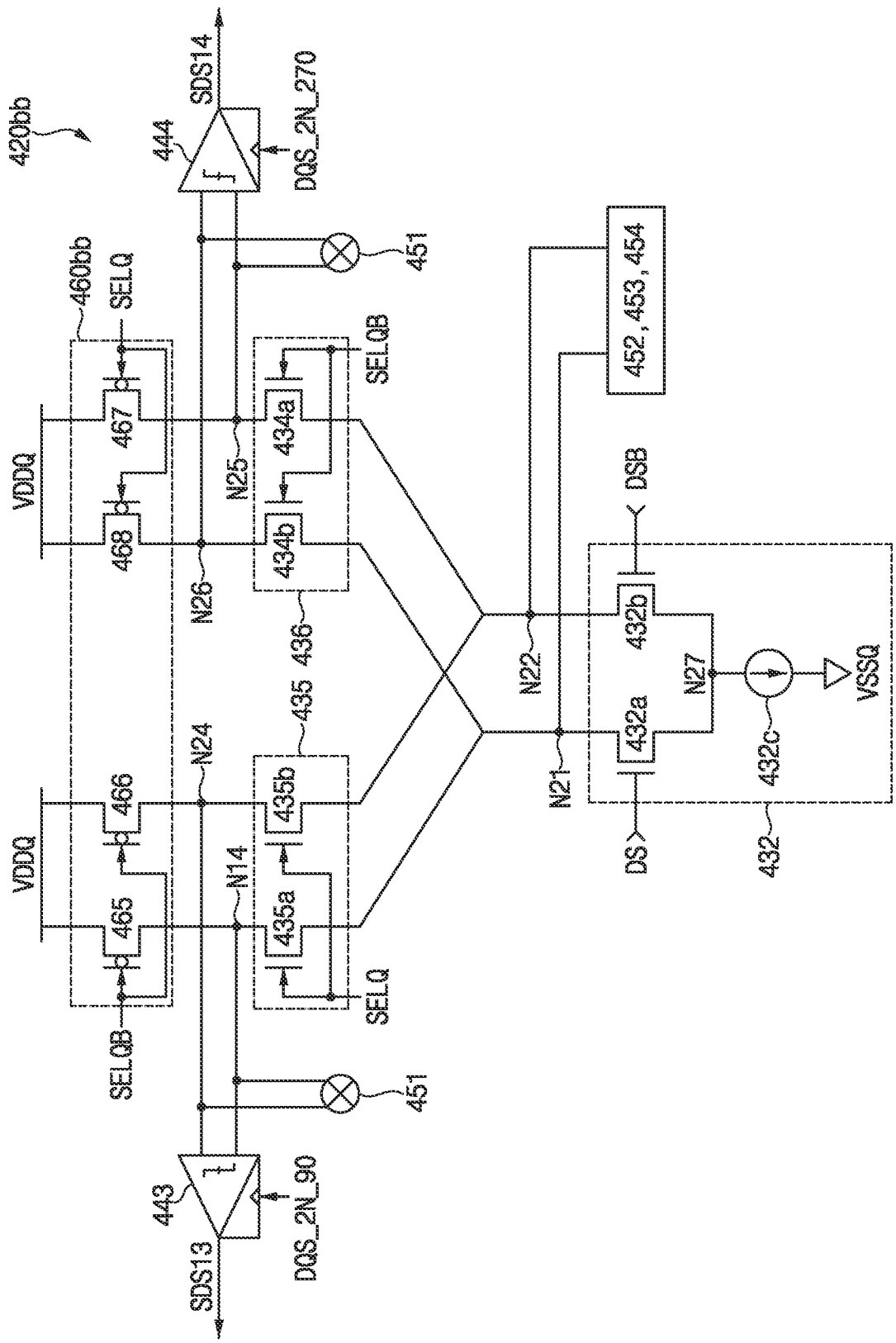
FIG. 11B illustrates a second portion of the decision feedback equalizer of FIG. 7B according to example embodiments.

FIG. 11B illustrates a second portion of the decision feedback equalizer of FIG. 7B according to example embodiments. Referring to FIG. 11B, a second portion of a decision feedback equalizer 420bb may include the second summer 432, the fifth summer 435, the sixth summer 436 and a load circuit 460bb. The decision feedback equalizer 420bb of FIG. 11B is different from the decision feedback equalizer 420ab of FIG. 8B in that the decision feedback equalizer 420bb includes the load circuit 460bb instead of the load circuit 460ab, and description repeated with respect to FIG. 8B will be omitted.

The load circuit 460bb may include a first PMOS transistor 465, a second PMOS transistor 466, a third PMOS transistor 467 and a fourth PMOS transistor 468 which are connected in parallel to the power supply voltage VDDQ. As shown, the first PMOS transistor 465 may be coupled between the power supply voltage VDDQ and the third node N23 and may have a gate receiving the fourth selection signal SELQB. The second PMOS transistor 466 may be coupled between the power supply voltage VDDQ and the fourth node N24 and may have a gate receiving the fourth selection signal SELQB. Similarly, the third PMOS transistor 467 may be coupled between the power supply voltage VDDQ and the fifth node N25 and may have a gate receiving the second selection signal SELQ. The fourth PMOS transistor 468 may be coupled between the power supply voltage VDDQ and the sixth node N26 and may have a gate receiving the second selection signal SELQ.

The first PMOS transistor 465 and the second PMOS transistor 466 may provide the third node N23 and the fourth node N24 with a current based on the power supply voltage VDDQ, respectively, during the second time interval in which the fourth selection signal SELQB is deactivated, and may hold voltage levels of the third node N23 and the fourth node N24 during the fourth time interval in which the fourth selection signal SELQB is activated. In addition, the third PMOS transistor 467 and the third PMOS transistor 468 may provide the fifth node N25 and the sixth node N26 with a current based on the power supply voltage VDDQ, respectively, during the fourth time interval in which the second selection signal SELQ is deactivated, and may hold voltage levels of the fifth node N25 and the sixth node N26 during the second time interval in which the second selection signal SELQ is activated.

Figure 12:
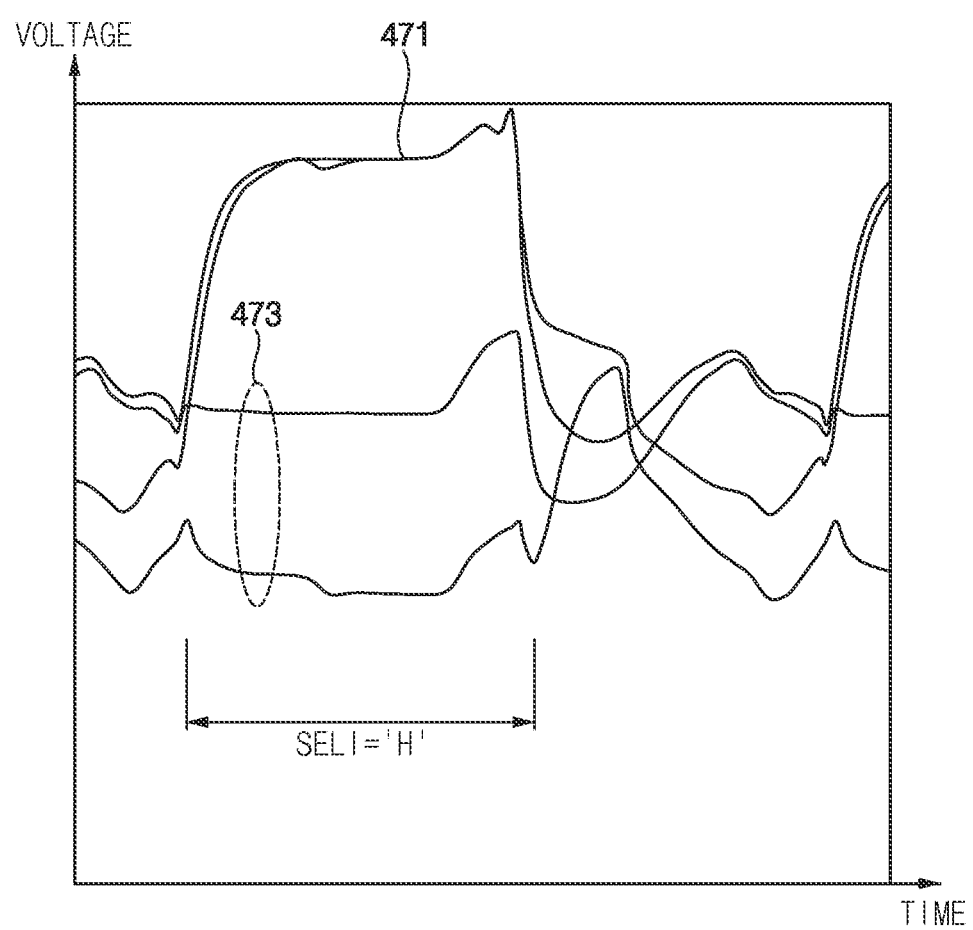
FIG. 12 illustrates voltage levels of the third node and the fourth node in FIG. 8A and the third node and the fourth node in FIG. 11A during the third time interval in which the first selection signal is deactivated.

FIG. 12 illustrates voltage levels of the third node and the fourth node in FIG. 8A and the third node and the fourth node in FIG. 11A during the third time interval in which the first selection signal is deactivated. Referring to FIGS. 8A, 11A and 12, when the third node N13 and the fourth node N14 in FIG. 8A are coupled to the resistors R11 and R12, respectively, voltage levels of the third node N13 and the fourth node N14 increase to levels of the power supply voltage VDDQ during the third time interval in which the first selection signal SELI is deactivated as a reference numeral 471 indicates. When the third node N23 and the fourth node N24 in FIG. 11A are coupled to the PMOS transistors 461 and 462, respectively, voltage levels of the third node N23 and the fourth node N24 are maintained at a fixed level during the third time interval in which the first selection signal SELI is deactivated as a reference numeral 473 indicates.

Figure 13:
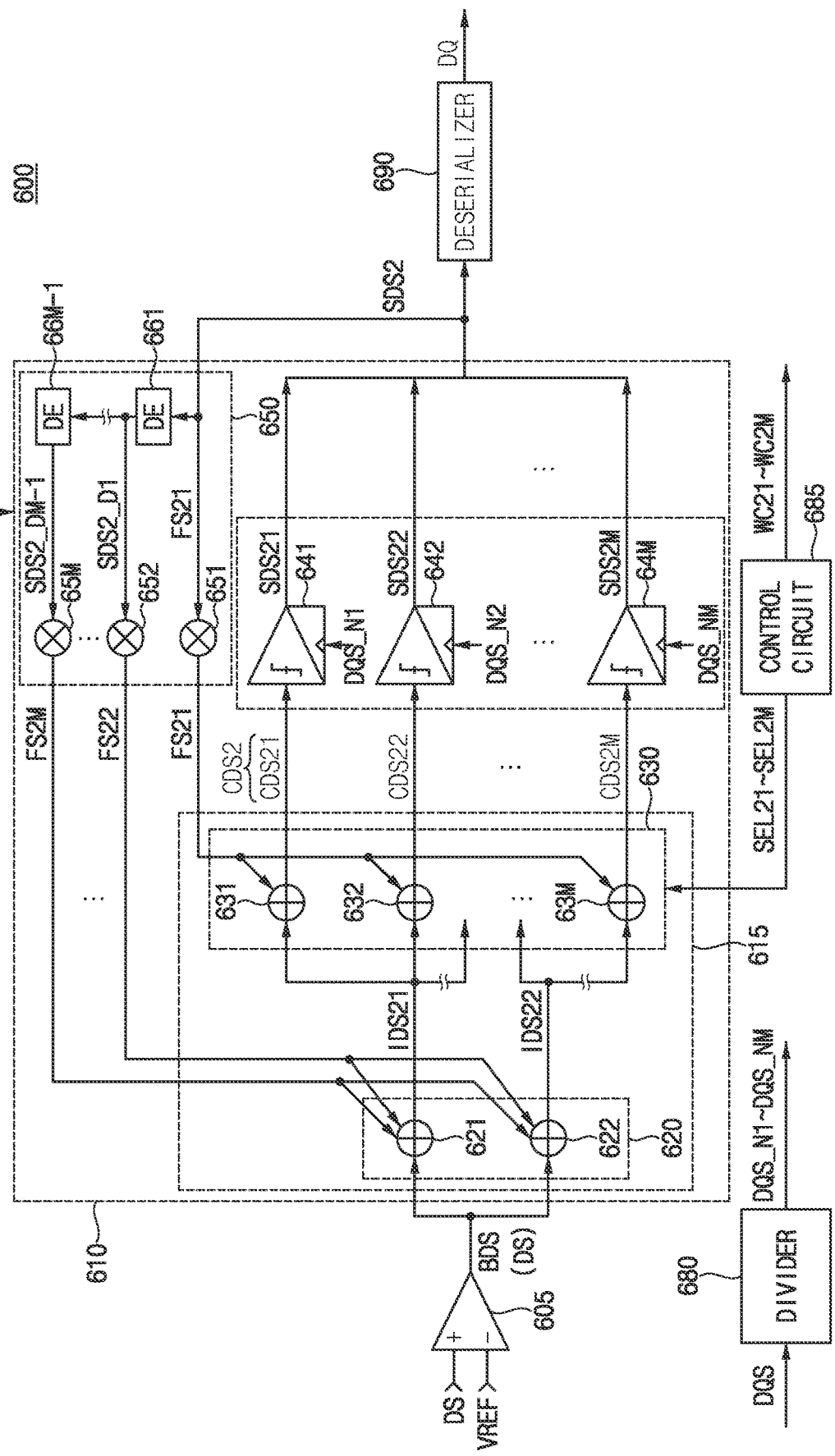
FIG. 13 is a block diagram illustrating an example of a receiver according to example embodiments.

FIG. 13 is a block diagram illustrating another example of a receiver according to example embodiments. Referring to FIG. 13, a receiver 600 may include a buffer 605, a decision feedback equalizer 610, a deserializer 690, a divider 680 and a control circuit 685. The buffer 605 may receive the data signal DS and may generate a buffered data signal BDS by comparing the received data signal DS with a reference voltage VREF. The buffer 605 may include a positive input terminal to receive the data signal DS, a negative input terminal to receive the reference voltage VREF and an output terminal to provide the buffered data signal BDS.

In example embodiments, the receiver 600 may not include the buffer 605. When the receiver 600 does not include the buffer 605, the decision feedback equalizer 610 may directly receive the data signal DS. The decision feedback equalizer 610 may include a multi-stage summer circuit 615, a sampling circuit 640 and a feedback circuit 650.

The multi-stage summer circuit 615 may include a first stage 620 and a second stage 630 that are cascade-connected. The first stage 620 may generate a first internal data signal IDS21 and a second internal data signal IDS22 based on the data signal DS and second portions FS22, . . . , FS2M of feedback signals FS21, FS22, . . . , FS2M. Here, M is a natural number greater than four (4). For example, in some embodiments, M may be eight (8). The second stage 630 may generate a compensated data signal CDS2 based on the first internal data signal IDS21, the second internal data signal IDS22 and a first portion FS21 of the feedback signals FS21, FS22, . . . , FS2M.

In particular, the first stage 620 may include a first summer 621 and a second summer 622 and the second stage 630 may include a plurality of summers 631, 632, . . . , 63M. The first summer 621 may generate the first internal data signal IDS21 by summing the data signal DS with the feedback signals FS22, . . . , FS2M and may provide the first internal data signal IDS21 to upper half of the plurality of summers 631, 632, . . . , 63M. The second summer 622 may generate the second internal data signal IDS22 by summing the data signal DS with the feedback signals FS22, . . . , FS2M and may provide second internal data signal IDS22 to lower half of the plurality of summers 631, 632, . . . , 63M.

The upper half of the plurality of summers 631, 632, . . . , 63M may generate upper half of bits CDS21, CDS22, . . . , CDS2M of the compensated data signal CDS2 by summing the first internal data signal IDS21 and the feedback signal FS21 based on first portions of selection signals SEL21, . . . , SEL2M and the lower half of the plurality of summers 631, 632, . . . , 63M may generate lower half of bits CDS21, CDS22, . . . , CDS2M of the compensated data signal CDS2 by summing the second internal data signal IDS22 and the feedback signal FS21 based on second portions of selection signals SEL21, . . . , SEL2M.

The sampling circuit 640 may generate bits SDS21, DSD22, . . . , SDS2M of sampled signal SDS2 by sampling the bits CDS21, CDS22, . . . , CDS2M of the compensated data signal CDS2 based on the divided strobe signals DQS_N1, . . . , DQS_NM and may provide the sampled signal SDS2 to the deserializer 690. The sampling circuit 640 may include a plurality of slicers 641, 642, . . . , 64M. Each of the plurality of slicers 641, 642, . . . , 64M may generate a respective one of the bits SDS21, DSD22, . . . , SDS2M of the sampled signal SDS2 by sampling respective one of the bits CDS21, CDS22, . . . , CDS2M of the compensated data signal CDS2 based on respective one of the divided strobe signals DQS_N1~DQS_NM having a predetermined phase difference.

The feedback circuit 650 may generate the feedback signals FS21, FS22, . . . , FS2M by multiplying the sampled signal SDS2 and delayed sampled signals with the weights WC21~WC2M, respectively, may provide the feedback signal FS21 to the second stage 630 and may provide the feedback signals FS22, . . . , FS2M to the first stage 620. The delayed sampled signals may be obtained by delaying the sampled signal SDS2 sequentially.

The feedback circuit 650 may include a plurality of taps 651, 652, . . . , 65M and a plurality of delay elements 661, . . . , 66M-1. The plurality of delay elements 661, . . . , 66M-1 may generate delayed sampled signals SDS_D1, . . . , SDS2_DM-1 by sequentially delaying the sampled signal SDS2. Each of the plurality of taps 651, 652, . . . , 65M may generate a respective one of the feedback signals FS21, FS22, . . . , FS2M by multiplying respective one of the sampled signal SDS2 and the delayed sampled signals SDS_D1, . . . , SDS2_DM-1 with respective one of the weights WC21~WC2M.

The deserializer 690 may generate a deserialized data DQ by deserializing the sampled signal SDS1. The deserialized data DQ may be referred to as an output data.

The divider 680 may generate the divided strobe signals DQS_N1~DQS_NM having a regular phase difference by diving the data strobe signal DQS and may provide the divided strobe signals DQS_N1~DQS_NM to the sampling circuit 640.

The control circuit 685 may generate the plurality of selection signals SEL21~SEL2M and may provide the plurality of SEL21~SEL2M to the second stage 630 of the decision feedback equalizer 620. The control circuit 685 may generate the weights WC21~WC2M and may provide the weights WC21~WC2M to the feedback circuit 650 of the decision feedback equalizer 610.

Therefore, in the decision feedback equalizer 610, summers are divided into the first stage 620 and the second stage 630 and are cascade-connected and the feedback circuit 650 provides the feedback signal FS21 to the second stage 630 and provides the feedback signals FS22, . . . , FS2M to the first stage 620. Accordingly, critical path and non-critical path are separated from each other and the decision feedback equalizer 610 operates with high speed. In addition, the summers in the second stage 630 generates the bits of the compensated data signal CDS2 by operating based on time division scheme, in response to the plurality of selection signals SEL21~SEL2M, and thus power consumption may be reduced.

Figure 14:
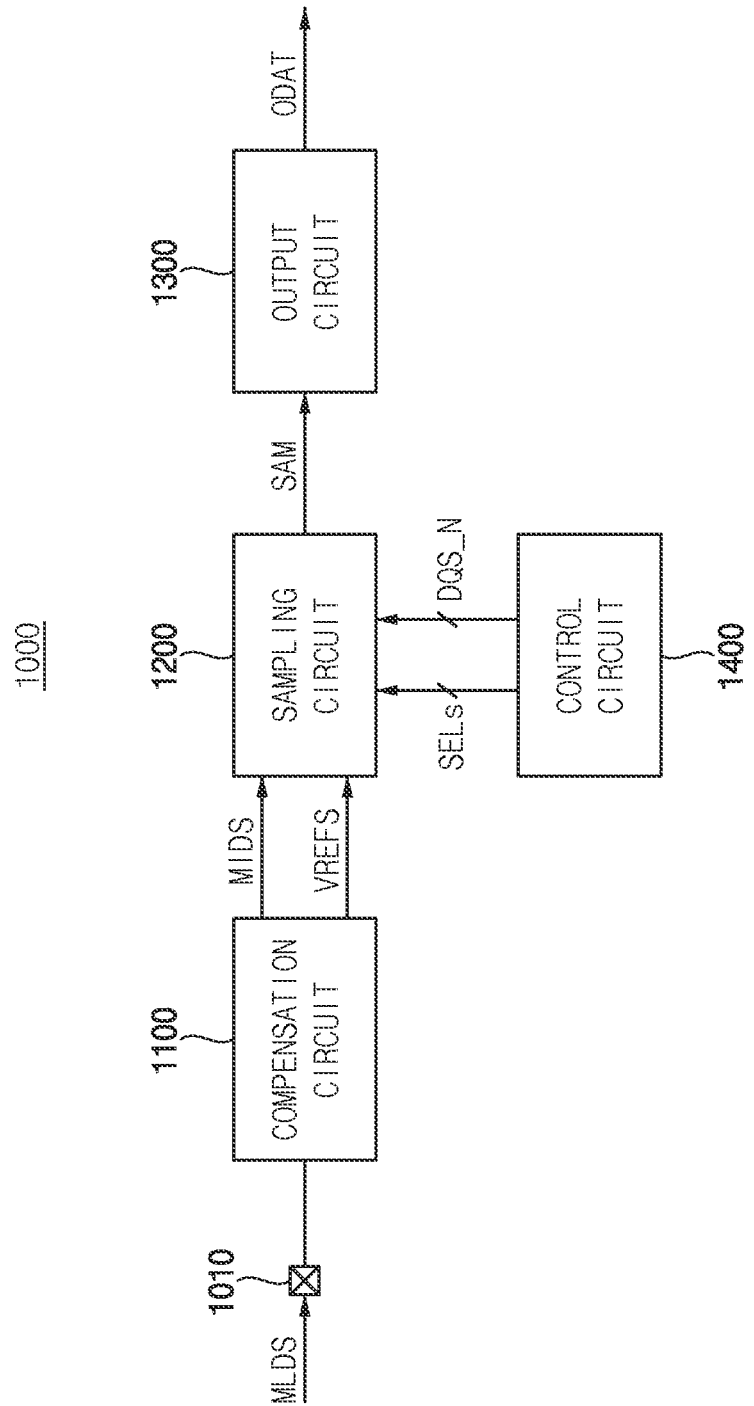
FIG. 14 is a block diagram illustrating a receiver according to example embodiments.

FIG. 14 is a block diagram illustrating a receiver according to example embodiments. Referring to FIG. 14, a receiver 1000 may include a compensation circuit 1100, a sampling circuit 1200, an output circuit 1300 and a reset control circuit 1400. The receiver 1000 may further include a data input pad (or pin) 1010, and may receive a data signal MLDS that is a multi-level signal having three or more voltage levels, and generate output data ODAT that is multi-bit data including two or more bits based on the data signal MLDS. For example, the multi-level signal may have one of three or more voltage levels that are different from each other during one unit interval (UI), and the multi-bit data may include two or more bits that are different from each other. The receiver 1000 may be included in various communication systems and/or signal transmission systems, and may be included in, for example, a semiconductor memory device and/or a memory system.

The compensation circuit 1100 may generate a plurality of data signals (or intermediate data signals) MIDS and a plurality of reference voltages VREFS by compensating inter-symbol interference (ISI) on the data signal MLDS, which is the multi-level signal. Each of the plurality of reference voltages VREFS includes a plurality of compensation reference levels. The sampling circuit 1200 may generate a plurality of sample signals SAM based on the plurality of data signals MIDS and the plurality of reference voltages VREFS. Each of the plurality of sample signals SAM includes a plurality of decision values.

In some example embodiments, the compensation circuit 1100 and the sampling circuit 1200 may form a decision feedback equalizer (DFE), and may be implemented in a loop-unrolling structure. Detailed configurations of the compensation circuit 1100 and the sampling circuit 1200 will be described with reference to FIG. 16. In some example embodiments, the compensation circuit 1100 may generate the plurality of compensation reference levels by performing an equalization (or equalizing) technique on a plurality of reference levels. For example, the compensation circuit 1100 may perform a post-cursor cancellation based on a decision feedback equalization, and may be referred to as a post-cursor cancellation circuit. The plurality of reference levels may be used to sense or detect voltage levels of the multi-level signal. When the equalization is performed on the plurality of reference levels, the plurality of compensation reference levels may be generated by adjusting or controlling increasing and/or decreasing directions for the plurality of reference levels and the amount of change in the plurality of reference levels. For example, the sampling circuit 1200 may perform a decision (or determination) based on an output of the compensation circuit 1100, and may be referred to as a decision circuit or a slicer circuit.

The output circuit 1300 may generate the output data ODAT that is the multi-bit data based on the plurality of sample signals SAM, and may select a current value of the output data ODAT based on a previous value of the output data ODAT. For example, the output circuit 1300 may be used to decide or determine an output in the loop-unrolling structure. A detailed configuration of the output circuit 1300 will be described with reference to FIG. 17.

The control circuit 1400 may generate selection signals SELs and divided strobe signals DQS_N and may provide the selection signals SELs and the divided strobe signals DQS_N to the sampling circuit 1200. The data input pad 1010 may be connected to the compensation circuit 1100, and may receive the data signal MLDS. For example, a pad may be a contact pad or a contact pin, but example embodiments are not limited thereto.

The data signal MLDS is received based on a multi-level signaling scheme. The multi-level signaling scheme may be used as a means of compressing the bandwidth required to transmit data at a given bit rate. In a simple binary scheme, two single symbols, usually two voltage levels, may be used to represent '1' and '0,' and thus the symbol rate may be equal to the bit rate. In contrast, the principle of the multi-level signaling scheme may be to use a larger alphabet of m symbols to represent data, so that each symbol may represent more than one bit of data. As a result, the number of symbols that needs to be transmitted may be less than the number of bits (e.g., the symbol rate may be less than the bit rate), and thus the bandwidth may be compressed.

In other words, the multi-level signaling scheme may be used to increase a data transmission (or transfer) rate without increasing the frequency of data transmission and/or a transmission power of the communicated data. An example of one type of the multi-level signaling scheme may be a pulse amplitude modulation (PAM) scheme, where a unique symbol of a multi-level signal may represent a plurality of bits of data. The number of possible pulse amplitudes in a digital PAM scheme may be some power of two. For example, there may be $2^2$ possible discrete pulse amplitudes in a 4-level PAM (e.g., in PAM4), there may be $2^3$ possible discrete pulse amplitudes in an 8-level PAM (e.g., in PAM8), and there may be $2^4$ possible discrete pulse amplitudes in a 16-level PAM (e.g., in PAM16). However, example embodiments are not limited thereto, and example embodiments may be applied or employed to a K-level PAM (e.g., PAM (K)) having K possible pulse amplitudes, where K is a natural number greater than or equal to three.

In a general data I/O interface, a data signal is transmitted to a receiver through a channel. Recently, as the data rate increases, interference signals due to the channel influence may increase, and thus the characteristic and/or quality of a received signal may be degraded or deteriorated. To solve this problem or improve signal integrity (SI), the equalization (or equalizing) technique has been used to restore or recover the received signal by canceling or compensating the interference signals. One of various equalization techniques is the decision feedback equalization. In the decision feedback equalization, the signal integrity may be improved by canceling the interference signals (e.g., by canceling post-cursors that cause the inter-symbol interference), however, there may be a feedback delay because current data is compensated after determining the amount of signal compensation depending on a result of deciding previous data. To reduce the feedback delay, the decision feedback equalization with the loop-unrolling structure has been researched. In the loop-unrolling structure, output candidates may be generated by pre-calculating compensation signals based on all possible results of decision values, and then one of the output candidates may be selected as a final output value.

Figure 15A:
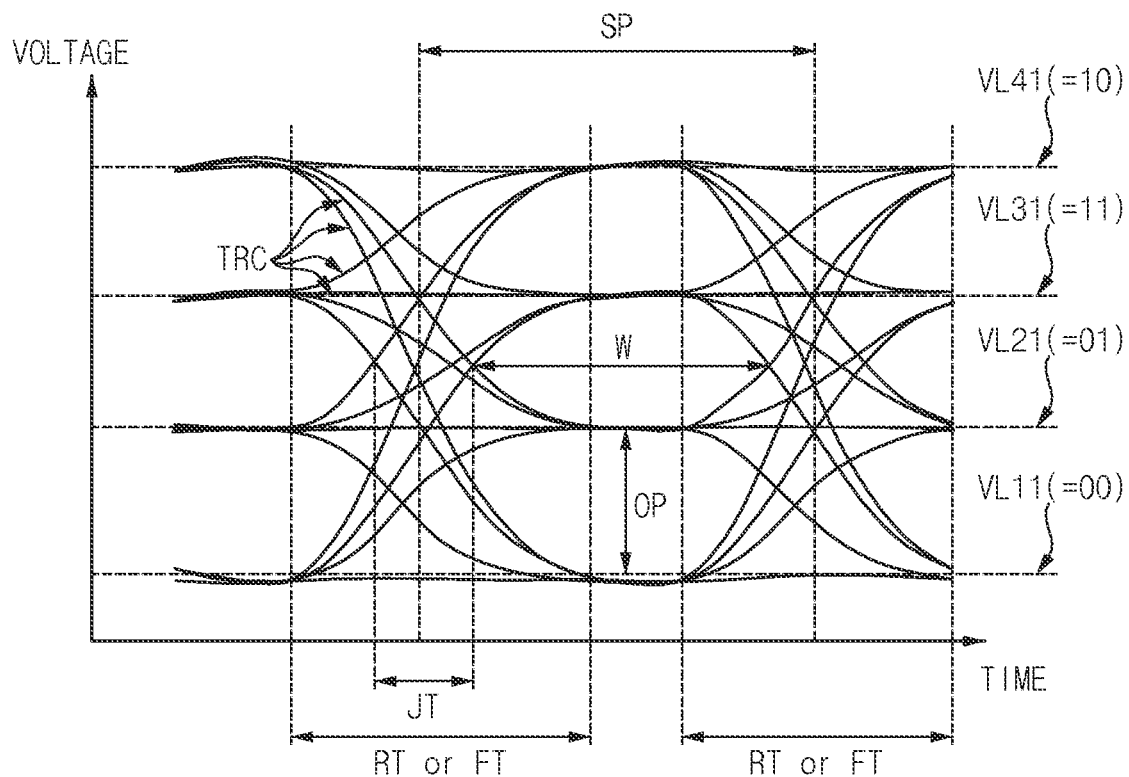
FIGS. 15A and 15B are diagrams for describing a data signal that is generated based on multi-level signaling scheme according to example embodiments.
Figure 15B:
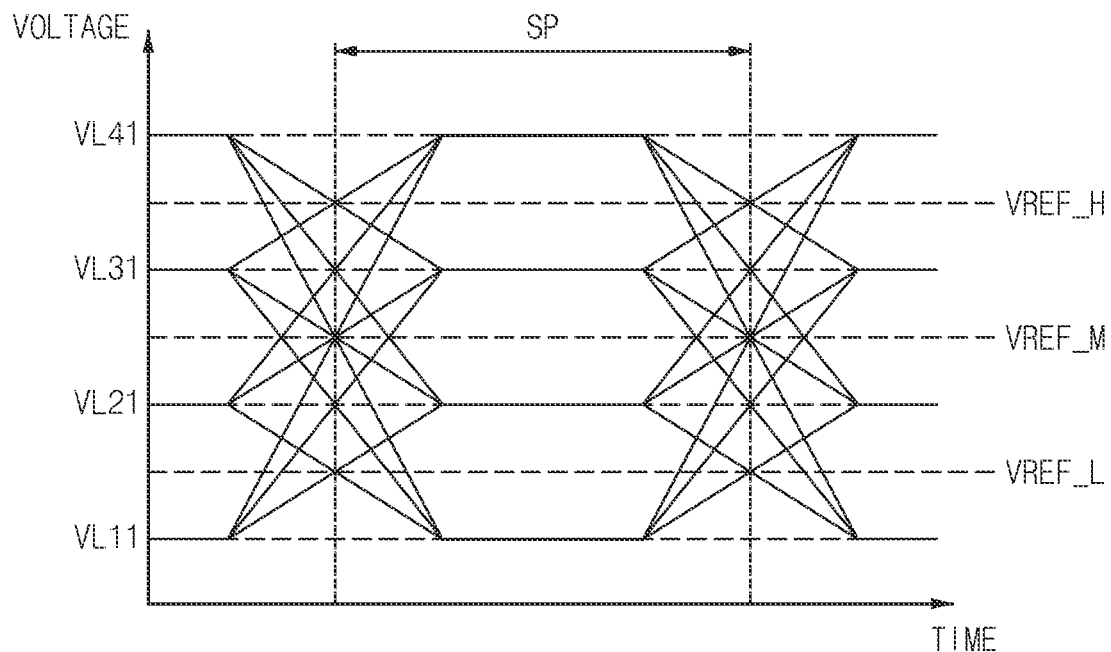

FIGS. 15A and 15B are diagrams for describing a data signal that is generated based on multi-level signaling scheme according to example embodiments. In particular, FIG. 15A illustrates an ideal eye diagram of a data signal (e.g., a PAM4 signal) generated based on the 4-level scheme (e.g., the PAM4 scheme) that is an example of the multi-level signaling scheme (e.g., the PAM scheme), whereas FIG. 15B is a diagram illustrated by simplifying the ideal eye diagram of FIG. 15A.

Referring to FIG. 15A, an eye diagram may be used to indicate the quality of signals in high-speed transmissions. For example, the eye diagram may represent four symbols of a signal (e.g., '00,' '01,' '10' and '11'), and each of the four symbols may be represented by a respective one of different voltage levels (e.g., voltage amplitudes) VL11, VL21, VL31 and VL41. The eye diagram may be used to provide a visual indication of the health of the signal integrity, and may indicate noise margins of the data signal. For example, when a Gray code is used, the voltage levels VL11, VL21, VL31 and VL41 may be mapped to '00', '01', '11', and '10', respectively.

To generate the eye diagram, an oscilloscope or other computing device may sample a digital signal according to a sample period SP (e.g., a unit interval or a bit period). The sample period SP may be defined by a clock associated with the transmission of the measured signal. The oscilloscope or other computing device may measure the voltage level of the signal during the sample period SP to form the plurality of traces TRC. Various characteristics associated with the measured signal may be determined by overlaying the plurality of traces TRC.

The eye diagram may be used to identify a number of characteristics of a communication signal such as jitter, cross talk, electromagnetic interference (EMI), signal loss, signal-to-noise ratio (SNR), other characteristics, or combinations thereof. For example, a width W of an eye in the eye diagram may be used to indicate a timing synchronization of the measured signal or jitter effects of the measured signal. For example, the eye diagram may indicate an eye opening OP, which represents a peak-to-peak voltage difference between the various voltage levels VL11, VL21, VL31 and VL41. The eye opening OP may be related to a voltage margin for discriminating between different voltage levels VL11, VL21, VL31 and VL41 of the measured signal. For example, the eye diagram may be used to identify a rise time RT and/or a fall time FT for transitions from a first amplitude to a second amplitude. The rise time RT or the fall time FT may indicate a time required for transitioning from one voltage level to another voltage level, may be related to or associated with a rising edge and a falling edge, respectively. For example, the eye diagram may be used to identify an amount of jitter JT in the measured signal. The jitter JT may refer to a timing error that results from a misalignment of rise and fall times.

Referring to FIG. 15B, different first, second, third and fourth voltage levels VL11, VL21, VL31 and VL41 of the data signal that is the PAM4 signal are illustrated, and different first, second and third reference levels VREF_H, VREF_M and VREF_L for sensing or detecting the level of the data signal are illustrated. For example, the number of the reference levels may be less than the number of the voltage levels of the data signal by one.

The first voltage level VL11 that is the lowest voltage level among the voltage levels VL11~VL41 may be lower than the second voltage level VL21, the second voltage level VL21 may be lower than the third voltage level VL31, and the third voltage level VL31 may be lower than the fourth voltage level VL41 that is the highest voltage level among the voltage levels VL11~VL41. In addition, the first reference level VREF_H may be a level between the third and fourth voltage levels VL31 and VL41, the second reference level VREF_M may be a level between the second and third voltage levels VL21 and VL31, and the third reference level VREF_L may be a level between the first and second voltage levels VL11 and VL21. The voltage level (e.g., the symbol) of the data signal may be decided or determined based on a result of comparing the data signal with the reference levels VREF_H, VREF_M and VREF_L.

Figure 16:
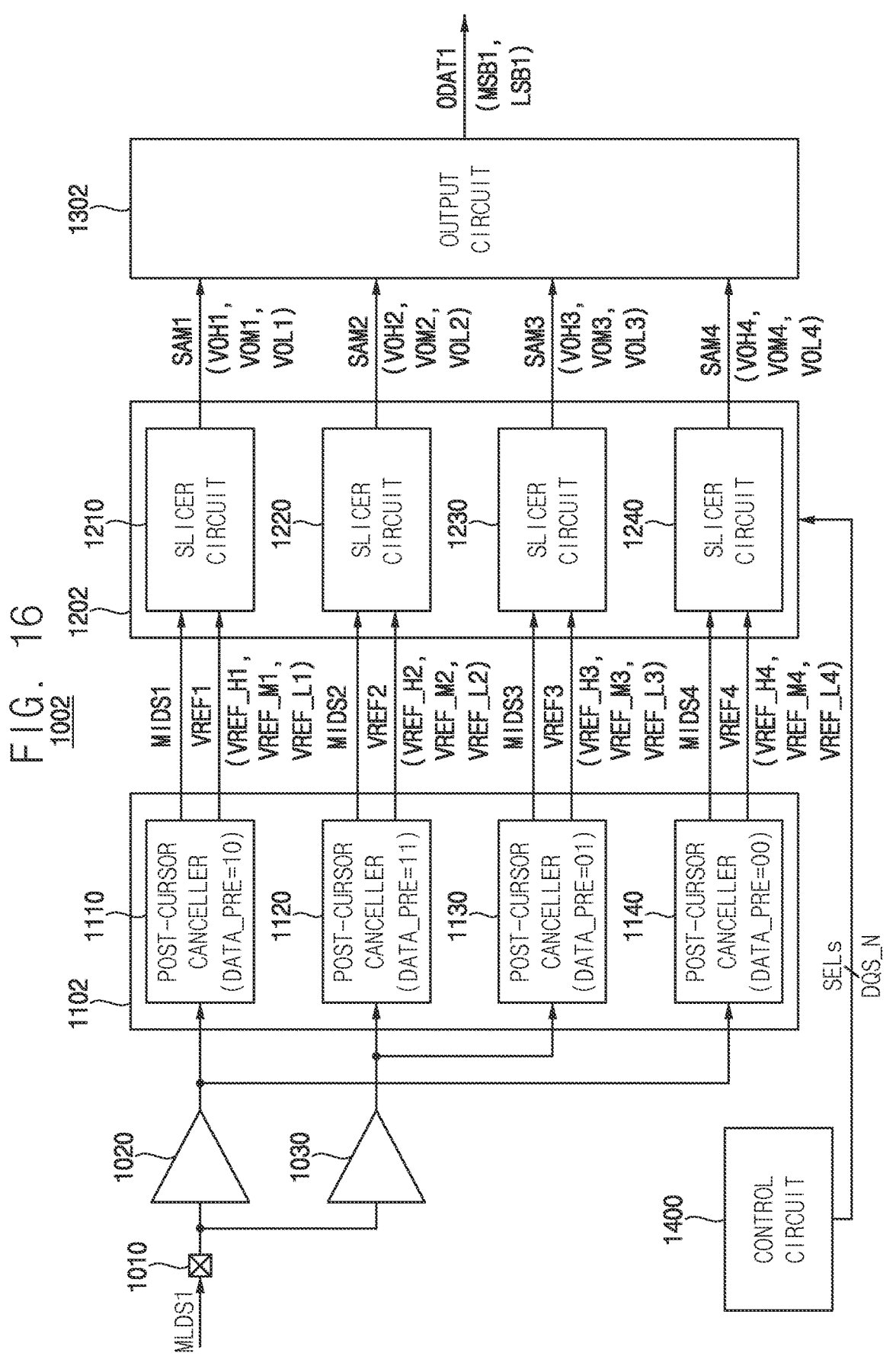

FIG. 16 is a block diagram illustrating an example of the receiver of FIG. 14 according to example embodiments. Referring to FIG. 16, a receiver 1002 may include a compensation circuit 1102, a sampling circuit 1202, an output circuit 1302 and a control circuit 1400. The receiver 1002 may further include a data input pad 1010, a first buffer 1020 and a second buffer 1030. The data input pad 1010 may receive a data signal MLDS1 having one of the first, second, third and fourth voltage levels VL11, VL21, VL31 and VL41 during one UI.

The compensation circuit 1102 may include a first post-cursor canceller 1110, a second post-cursor canceller 1120, a third post-cursor canceller 1130 and a fourth post-cursor canceller 1140.

The first post-cursor canceller 1110 may generate a first data signal MIDS1 and a first reference voltage VREF1 based on when a previous value DATA_PRE of output data ODAT1 is '10' (e.g., corresponds to the fourth voltage level VL41). The second post-cursor canceller 1120 may generate a second data signal MIDS2 and a second reference voltage VREF2 based on when the previous value DATA_PRE of the output data ODAT1 is '11' (e.g., corresponds to the third voltage level VL31). The third post-cursor canceller 1130 may generate a third data signal MIDS3 and a third reference voltage VREF3 based on when the previous value DATA_PRE of the output data ODAT1 is '01' (e.g., corresponds to the second voltage level VL21). The fourth post-cursor canceller 1140 may generate a fourth data signal MIDS4 and a fourth reference voltage VREF4 based on when the previous value DATA_PRE of the output data ODAT1 is '00' (e.g., corresponds to the first voltage level VL11). For example, each post-cursor canceller may include a feedback filter having an n-tap structure, where n is a natural number.

The first reference voltage VREF1 may include first, second and third compensation reference levels VREF_H1, VREF_M1 and VREF_L1. The second reference voltage VREF2 may include fourth, fifth and sixth compensation reference levels VREF_H2, VREF_M2 and VREF_L2. The third reference voltage VREF3 may include seventh, eighth and ninth compensation reference levels VREF_H3, VREF_M3 and VREF_L3. The fourth reference voltage VREF4 may include tenth, eleventh and twelfth compensation reference levels VREF_H4, VREF_M4, and VREF_L4. Each of the first, fourth, seventh and tenth compensation reference levels VREF_H1, VREF_H2, VREF_H3 and VREF_H4 may correspond to the first reference level VREF_H, and may be generated by increasing or decreasing the first reference level VREF_H by a specific level based on the equalization. Similarly, each of the second, fifth, eighth and eleventh compensation reference levels VREF_M1, VREF_M2, VREF_M3 and VREF_M4 may correspond to the second reference level VREF_M, and may be generated by increasing or decreasing the second reference level VREF_M by a specific level based on the equalization. Each of the third, sixth, ninth and twelfth compensation reference levels VREF_L1, VREF_L2, VREF_L3 and VREF_L4 may correspond to the third reference level VREF_L, and may be generated by increasing or decreasing the third reference level VREF_L by a specific level based on the equalization.

In some example embodiments, the data signals MIDS1 to MIDS4 may be substantially the same as each other. In other example embodiments, the first data signal MIDS1 and the first reference voltage VREF1 may be provided as a pair of differential signals, another data signal and a corresponding reference voltage may also be provided as a pair of differential signals, and thus the data signals MIDS1 to MIDS4 may be different from each other.

The sampling circuit 1202 may include a first slicer circuit 1210, a second slicer circuit 1220, a third slicer 1230 and a fourth slicer circuit 1240. The first slicer circuit 1210 may generate a first sample signal SAM1 by comparing the first data signal MIDS1 with the first, second and third compensation reference levels VREF_H1, VREF_M1 and VREF_L1. The second slicer circuit 1220 may generate a second sample signal SAM2 by comparing the second data signal MIDS2 with the fourth, fifth and sixth compensation reference levels VREF_H2, VREF_M2 and VREF_L2. The third slicer circuit 1230 may generate a third sample signal SAM3 by comparing the third data signal MIDS3 with the seventh, eighth and ninth compensation reference levels VREF_H3, VREF_M3 and VREF_L3. The fourth slicer circuit 1240 may generate a fourth sample signal SAM4 by comparing the fourth data signal MIDS4 with the tenth, eleventh and twelfth compensation reference levels VREF_H4, VREF_M4 and VREF_L4.

The first sample signal SAM1 may include first, second and third decision values VOH1, VOM1 and VOL1. The second sample signal SAM2 may include fourth, fifth and sixth decision values VOH2, VOM2 and VOL2. The third sample signal SAM3 may include seventh, eighth and ninth decision values VOH3, VOM3, and VOL3. The fourth sample signal SAM4 may include tenth, eleventh and twelfth decision values VOH4, VOM4 and VOL4. Each of the first, fourth, seventh and tenth decision values VOH1, VOH2, VOH3 and VOH4 may represent a decision result obtained by comparing the data signal MDS1 with a respective one of the first reference levels equalized by the compensation circuit 1102. Similarly, each of the second, fifth, eighth and eleventh decision values VOM1, VOM2, VOM3 and VOM4 may represent a decision result obtained by comparing the data signal MDS1 with a respective one of the second reference levels equalized by the compensation circuit 1102. Each of the third, sixth, ninth and twelfth decision values VOL1, VOL2, VOL3 and VOL4 may represent a decision result obtained by comparing the data signal MDS1 with a respective one of the third reference levels equalized by the compensation circuit 1102.

The output circuit 1302 may generate the output data ODAT1 including a first bit MSB1 and a second bit LSB1 based on the first through twelfth decision values VOH1~VOH4, VOM1~VOM4 and VOL1~VOL4. The first and second bits MSB1 and LSB1 may be a most significant bit (MSB) and a least significant bit (LSB) of the output data ODAT1, respectively. For example, when the output data ODAT1 is '10', the first bit MSB1 may be '1', and the second bit LSB1 may be '0'.

The first buffer 1020 may buffer the data signal MLDS1 and may provide the buffered data signal to the first and fourth post-cursor cancellers 1110 and 1140. The second buffer 1030 may buffer the data signal MLDS1 and may provide the buffered data signal to the second and third post-cursor cancellers 1120 and 1130.

The control circuit 1400 may generate the selection signals SELs and the divided strobe signals DQS_N and may provide the selection signals SELs and the divided strobe signals DQS_N to the sampling circuit 1202.

As described above, the receiver 1002 may be implemented in the loop-unrolling structure such that the compensation circuit 1102 and the sampling circuit 1202 pre-calculate all possible decision results and generate output candidates based thereon and the output circuit 1302 selects one of the output candidates as a final output value.

In some example embodiments, as will be described with reference to FIG. 17, the output circuit 1302 may select or determine an output value of the loop-unrolling structure based on the first and second bits MSB1 and LSB1. In this example, the number of multiplexers and flip-flops may be reduced, and a load at an input-end viewed through the buffer may be reduced.

Figure 17:
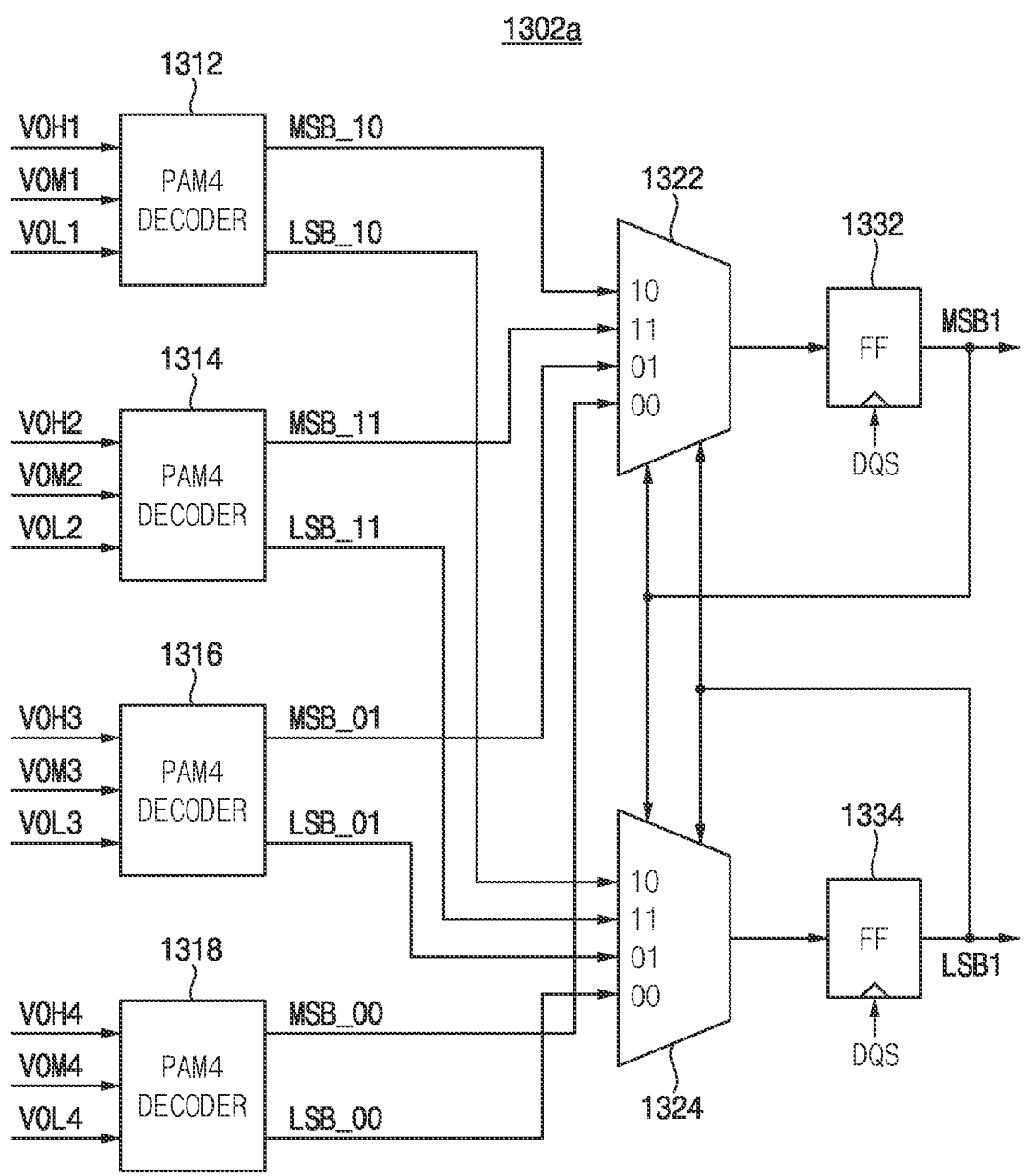
FIG. 17 is a block diagram illustrating an example of the output circuit in the receiver of FIG. 16 according to example embodiments.

FIG. 17 is a block diagram illustrating an example of the output circuit in the receiver of FIG. 16 according to example embodiments. Referring to FIG. 17, an output circuit 1302*a* may include a first decoder 1312, a second decoder 1314, a third decoder 1316, a fourth decoder 1318, a first multiplexer 1322 and a second multiplexer 1324. The output circuit 1302*a* may further include flip-flops (FF) 1332 and 1334 each of which operates based on the data strobe signal DQS.

The first decoder 1312 may generate a first MSB MSB_10 and a first LSB LSB_10 based on the first, second and third decision values VOH1, VOM1 and VOL1. The second decoder 1314 may generate a second MSB MSB_11 and a second LSB LSB_11 based on the fourth, fifth and sixth decision values VOH2, VOM2 and VOL2. The third decoder 1316 may generate a third MSB MSB_01 and a third LSB LSB_01 based on the seventh, eighth and ninth decision values VOH3, VOM3 and VOL3. The fourth decoder 1318 may generate a fourth MSB MSB_00 and a first LSB LSB_00 based on the tenth, eleventh and twelfth decision values VOH4, VOM4 and VOL4.

The first multiplexer 1322 may output the first bit (e.g., MSB) MSB1 of the output data ODAT1 by selecting one of the first, second, third and fourth MSBs MSB_10, MSB_11, MSB_01 and MSB_00. The second multiplexer 1324 may output the second bit (e.g., LSB) LSB1 of the output data ODAT1 by selecting one of the first, second, third and fourth LSBs LSB_10, LSB_11, LSB_01 and LSB_00. The first and second bits MSB1 and LSB1 of the output data ODAT1 may be synchronized with the data strobe signal DQS by the flip-flops 1332 and 1334.

Figure 18:
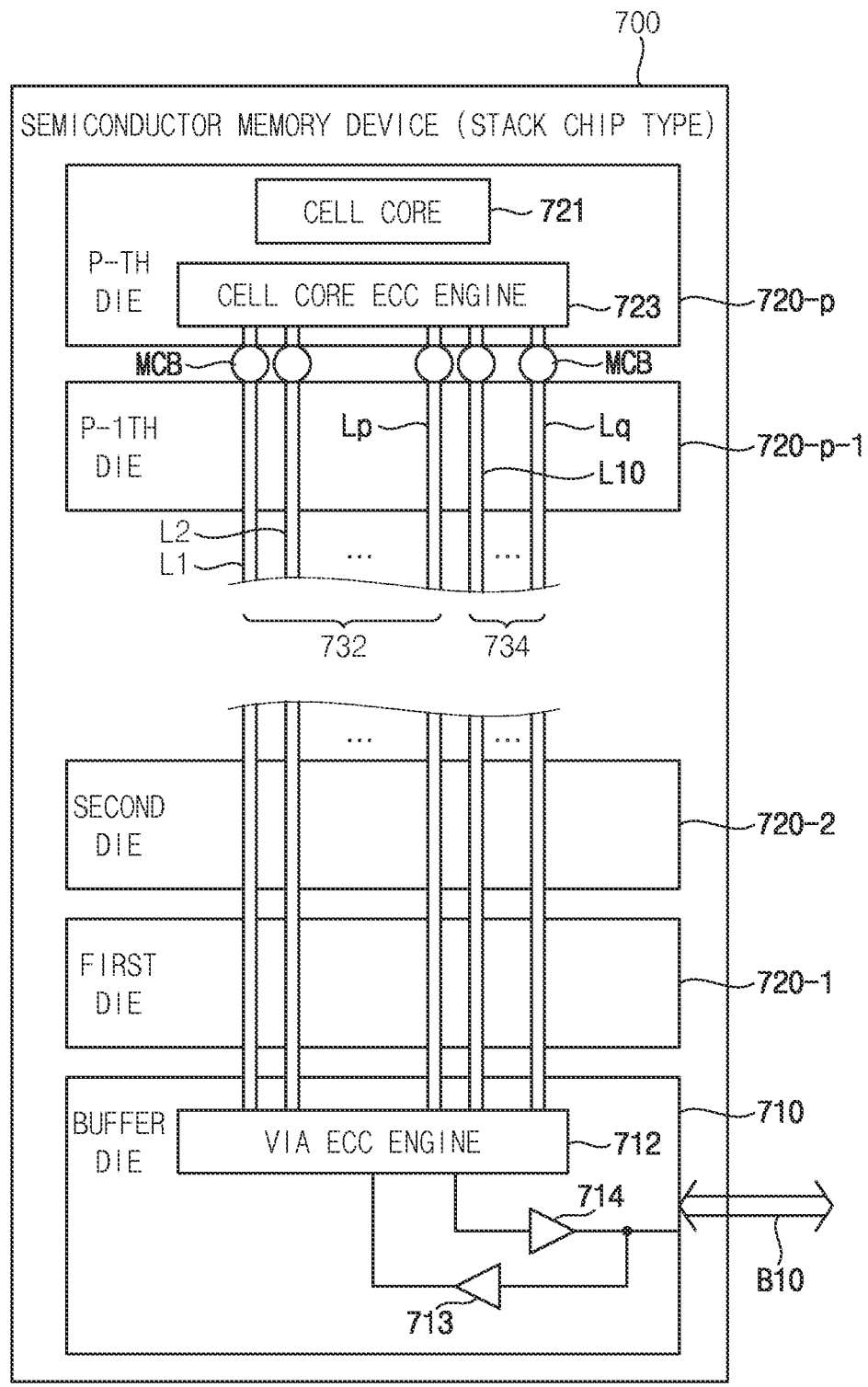
FIG. 18 is a block diagram illustrating a semiconductor memory device according to example embodiments.

FIG. 18 is a block diagram illustrating a semiconductor memory device according to example embodiments. Referring to FIG. 18, a semiconductor memory device 700 may include at least one buffer die 710 and a plurality of memory dies 720-1 to 720-*p* (p is a natural number equal to or greater than three) providing a soft error analyzing and correcting function in a stacked chip structure.

The plurality of memory dies 720-1 to 720-*p* are stacked on the buffer die 710 and conveys data through a plurality of through silicon via (TSV) lines. At least one of the memory dies 720-1 to 720-*p* may include a cell core 721 to store data and a cell core ECC engine 722 which generates transmission parity bits (i.e., transmission parity data) based on transmission data to be sent to the at least one buffer die 710. The cell core 721 may include a plurality of memory cells having DRAM cell structure.

The buffer die 711 may include a via ECC engine 712 which corrects a transmission error using the transmission parity bits when a transmission error is detected from the transmission data received through the TSV liens and generates error-corrected data. The buffer die 711 may further include a receiver 713 and a transmitter 714. The receiver 713 may employ the receiver 400 of FIG. 7A.

The semiconductor memory device 700 may be a stack chip type memory device or a stacked memory device which conveys data and control signals through the TSV lines. The TSV lines may be also called 'through electrodes'. The cell core ECC engine 722 may perform error correction on data which is outputted from the memory die 720-*p* before the transmission data is sent.

A transmission error which occurs at the transmission data may be due to noise which occurs at the TSV lines. Since data fail due to the noise occurring at the TSV lines may be distinguishable from data fail due to a false operation of the memory die, it may be regarded as soft data fail (or a soft error). The soft data fail may be generated due to transmission fail on a transmission path, and may be detected and remedied by an ECC operation.

With the above description, a data TSV line group 732 which is formed at one memory die 720-*p* may include TSV lines L1, L2 to Lp, and a parity TSV line group 734 may include TSV lines L10 to Lq. The TSV lines L1, L2 to Lp of the data TSV line group 732 and the parity TSV lines L10 to Lq of the parity TSV line group 734 may be connected to micro bumps MCB which are correspondingly formed among the memory dies 720-1 to 720-*p*. At least one of the memory dies 720-1 to 720-*p* may include DRAM cells each including at least one access transistor and one storage capacitor.

The semiconductor memory device 700 may have a three-dimensional (3D) chip structure or a 2.5D chip structure to communicate with the host through a data bus B10. The buffer die 710 may be connected with the memory controller through the data bus B10. The cell core ECC engine 722 may output transmission parity bits as well as the transmission data through the parity TSV line group 734 and the data TSV line group 732 respectively. The outputted transmission data may be data which is error-corrected by the cell core ECC engine 722.

The via ECC engine 712 may determine whether a transmission error occurs at the transmission data received through the data TSV line group 732, based on the transmission parity bits received through the parity TSV line group 734. When a transmission error is detected, the via ECC engine 712 may correct the transmission error on the transmission data using the transmission parity bits. When the transmission error is uncorrectable, the via ECC engine 712 may output information indicating occurrence of an uncorrectable data error.

Figure 19:
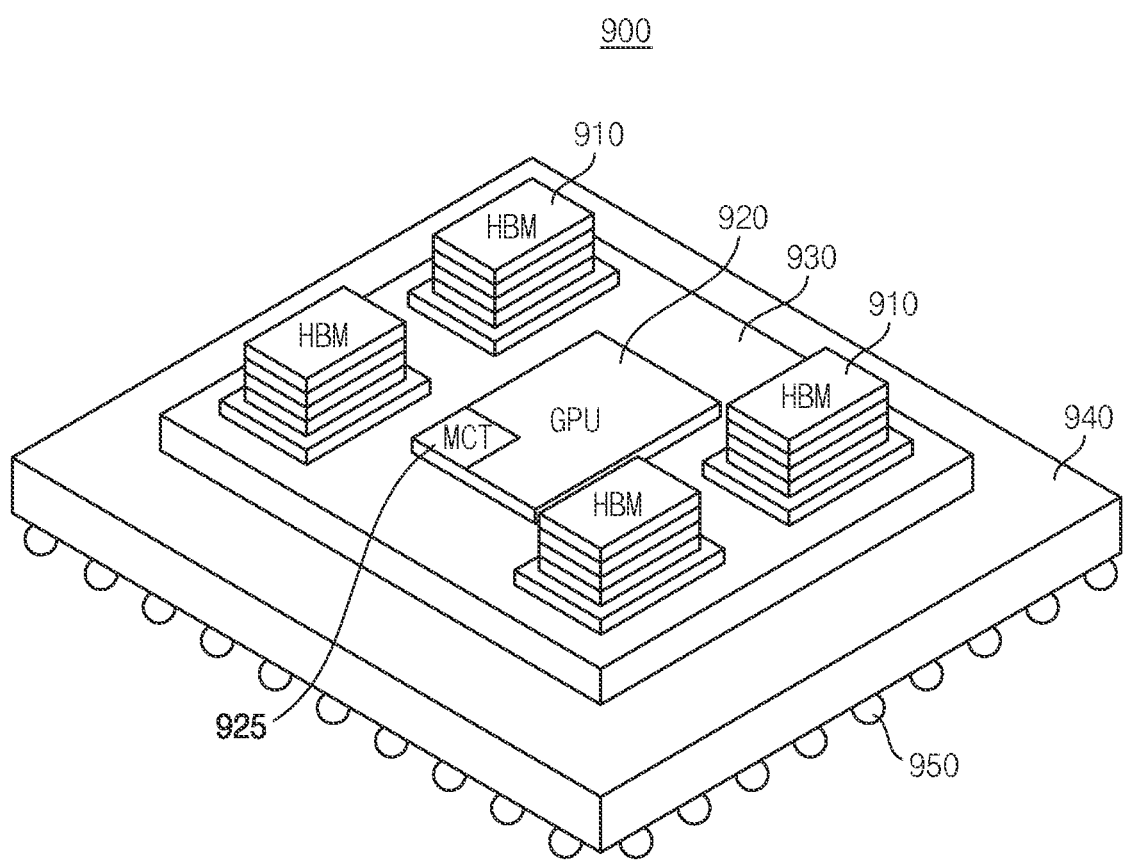
FIG. 19 is a configuration diagram illustrating a semiconductor package including the stacked memory device according to example embodiments.

FIG. 19 is a configuration diagram illustrating a semiconductor package including the stacked memory device according to example embodiments. Referring to FIG. 19, a semiconductor package 900 may include one or more stacked memory devices 910 and a graphic processing unit (GPU) 920.

The stacked memory devices 910 and the GPU 920 may be mounted on an interposer 930, and the interposer on which the stacked memory device 910 and the GPU 920 are mounted may be mounted on a package substrate 940 mounted on solder balls 950. The GPU 920 may correspond to a semiconductor device which may perform a memory control function, and for example, the GPU 920 may be implemented as an application processor (AP). The GPU 920 may include a memory controller MCT 925.

The stacked memory device 910 may be implemented in various forms, and the stacked memory device 910 may be a memory device in a high bandwidth memory (HBM) form in which a plurality of layers are stacked. Accordingly, the stacked memory device 910 may include a buffer die and a plurality of memory dies and the buffer die may include an above-mentioned receiver.

The plurality of stacked memory devices 910 may be mounted on the interposer 930, and the GPU 920 may communicate with the plurality of stacked memory devices 910. For example, each of the stacked memory devices 910 and the GPU 920 may include a physical region, and communication may be performed between the stacked memory devices 910 and the GPU 920 through the physical regions. Meanwhile, when the stacked memory device 910 includes a direct access region, a test signal may be provided into the stacked memory device 910 through conductive means (e.g., solder balls 950) mounted under package substrate 940 and the direct access region.

Figure 20:
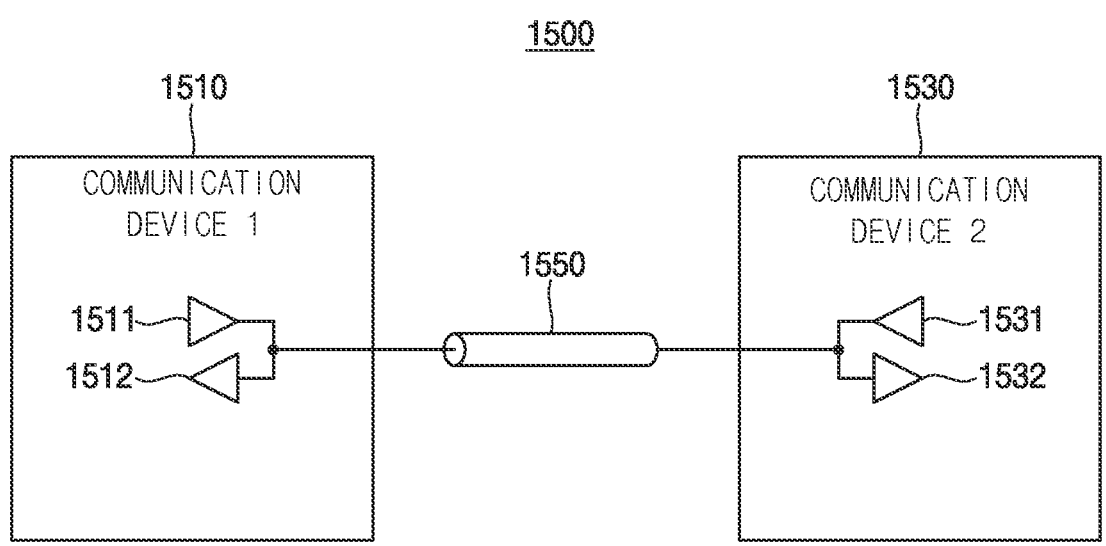
FIG. 20 is a block diagram illustrating a communication system according to example embodiments.

FIG. 20 is a block diagram illustrating a communication system according to example embodiments. Referring to FIG. 20, a communication system 1500 includes a first communication device 1510, a second communication device 1530 and a channel 1550.

The first communication device 1510 includes a first transmitter 1511 and a first receiver 1512. The second communication device 1530 includes a second transmitter 1531 and a second receiver 1532. The first transmitter 1511 and the first receiver 1512 are connected to the second transmitter 1531 and the second receiver 1532 through the channel 1550. In some example embodiments, each of the first and second communication devices 1510 and 1530 may include a plurality of transmitters and a plurality of receivers, and the communication system 1500 may include a plurality of channels for connecting the plurality of transmitters and a plurality of receivers.

The receivers 1512 and 1532 may be the receiver according to example embodiments, and may include a decision feedback equalizer. The decision feedback equalizer includes summers which are divided into the first stage and the second stage are cascade-connected, and the second stage summers operate based on time division scheme in response to a plurality of selection signals, and thus power consumption may be reduced.

The inventive concept may be applied to various devices and systems that include the memory devices and the memory systems. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A receiver, comprising:
   a decision feedback equalizer including a cascaded arrangement of a first stage having a first plurality of summers therein and a second stage having a second plurality of summers therein, the decision feedback equalizer configured to:
   generate a compensated data signal by summing a current value of a data signal and a plurality of feedback signals, in response to a plurality of selection signals;
   generate a sampled signal including a decision value by sampling bits of the compensated data signal, in response to a plurality of divided strobe signals;
   generate the feedback signals in response to a plurality of weights, the sampled signal, and at least one delayed version of the sampled signal; and
   provide a first portion of the feedback signals to the second stage, and a second portion of the feedback signals to the first stage.

2. The receiver of claim 1, further comprising:
a deserializer configured to generate output data by deserializing the sampled signal; and
a control circuit configured to generate the plurality of selection signals;
wherein the first stage is configured to generate a first internal data signal and a second internal data signal, in response to the data signal and the second portion of the feedback signals;
wherein the second stage is configured to generate the compensated data signal, in response to the first internal data signal, the second internal data signal and the first portion of the feedback signals; and
wherein the decision feedback equalizer further includes:
 a sampling circuit configured to generate bits of the sampled signal by sampling the bits of the compensated data signal, in response to the plurality of divided strobe signals; and
 a feedback circuit configured to generate the feedback signals by multiplying the sampled signal and delayed versions of sampled signal with corresponding ones of the plurality of weights, respectively.

3. The receiver of claim 2,
wherein the plurality of feedback signals include first, second, third and fourth feedback signals;
wherein the plurality of selection signals include first, second, third and fourth selection signals that are each staggered by 90°, 180° and 270° relative to the other selection signals;
wherein the first stage includes a first summer and a second summer;
wherein the second stage includes a third summer, a fourth summer, a fifth summer and a sixth summer; and
wherein each of the first summer, the third summer and the fourth summer is configured symmetrically with respective one of the second summer, the fifth summer and the sixth summer.

4. The receiver of claim 3,
wherein the first summer is configured to generate the first internal data signal by summing the data signal with the second through fourth feedback signals; and
wherein the second summer is configured to generate the second internal data signal by summing the data signal with the second through fourth feedback signals.

5. The receiver of claim 3,
wherein the third summer is configured to generate a first bit of the compensated data signal by summing the first internal data signal with the first feedback signal, in response to the first selection signal, during a first time interval;
wherein the fourth summer is configured to generate a second bit of the compensated data signal by summing the first internal data signal with the first feedback signal, in response to the third selection signal, during a third time internal not overlapping with the first time interval;
wherein the fifth summer is configured to generate a third bit of the compensated data signal by summing the second internal data signal with the first feedback signal, in response to the second selection signal, during a second time interval; and
wherein the sixth summer is configured to generate a fourth bit of the compensated data signal by summing the second internal data signal with the first feedback signal, in response to the fourth selection signal, during a fourth time interval not overlapping with the second time interval.

6. The receiver of claim 5, wherein the decision feedback equalizer further includes:
a load circuit including a first resistor, a second resistor, a third resistor and a fourth resistor, which are each connected to a power supply voltage;
wherein the third summer includes:
 a first n-channel metal-oxide semiconductor (NMOS) transistor, which is coupled to the first summer at a first node, coupled to the first resistor and a first tap that generates the first feedback signal at a third node and has a gate receiving the first selection signal; and
 a second NMOS transistor, which is coupled to the first summer at a second node, coupled to the second resistor and the first tap at a fourth node and has a gate receiving the first selection signal; and
wherein the fourth summer includes:
 a third NMOS transistor, which is coupled to the first summer at the second node, coupled to the third resistor and the first tap at a fifth node and has a gate receiving the third selection signal; and
 a fourth NMOS transistor, which is coupled to the first summer at the first node, coupled to the fourth resistor and the first tap at a sixth node and has a gate receiving the third selection signal.

7. The receiver of claim 6, wherein the first NMOS transistor and the second NMOS transistor are configured to connect the first node and the second node to the third node and the fourth node, respectively, during the first time interval in which the first selection signal is active.

8. The receiver of claim 6, wherein the third NMOS transistor and the fourth NMOS transistor are configured to connect the second node and the first node to the fifth node and the sixth node, respectively, during the third time interval in which the third selection signal is active.

9. The receiver of claim 5, wherein the decision feedback equalizer further includes:
a load circuit including a first p-channel metal-oxide semiconductor (PMOS) transistor, a second PMOS transistor, a third PMOS transistor and a fourth PMOS transistor, which are connected to a power supply voltage;
wherein the third summer includes:
 a first n-channel metal-oxide semiconductor (NMOS) transistor, which is coupled to the first summer at a first node, coupled to the first PMOS transistor and a first tap generating the first feedback signal at a third node and has a gate receiving the first selection signal; and
 a second NMOS transistor, which is coupled to the first summer at a second node, coupled to the second PMOS transistor and the first tap at a fourth node and has a gate receiving the first selection signal;
wherein the fourth summer includes:
 a third NMOS transistor, which is coupled to the first summer at the second node, coupled to the third PMOS transistor and the first tap at a fifth node and has a gate receiving the third selection signal; and
 a fourth NMOS transistor, which is coupled to the first summer at the first node, coupled to the fourth PMOS transistor and the first tap at a sixth node and has a gate receiving the third selection signal; and
wherein the gates of the first PMOS transistor and the second PMOS transistor receive the third selection signal, and the gates of the third PMOS transistor and the fourth PMOS transistor receive the third selection signal.

10. The receiver of claim 9, wherein, during the first time interval in which the first selection signal is active, the first NMOS transistor and the second NMOS transistor are configured to connect the first node and the second node to the third node and the fourth node, respectively, and each of the first PMOS transistor and the second PMOS transistor provides respective one of the third node and the fourth node with a current based on the power supply voltage.

11. The receiver of claim 9, wherein, during the third time interval in which the third selection signal is active, the first NMOS transistor and the second NMOS transistor are configured to hold voltage levels of the third node and the fourth node, respectively.

12. The receiver of claim 9, wherein, during the third time interval in which the third selection signal is active, the third NMOS transistor and the fourth NMOS transistor are configured to connect the second node and the first node to the fifth node and the sixth node, respectively, and each of the third PMOS transistor and the fourth PMOS transistor provides respective one of the fifth node and the sixth node with a current based on the power supply voltage.

13. The receiver of claim 9, wherein, during the first time interval in which the first selection signal is active, the third PMOS transistor and the fourth PMOS transistor are configured to hold voltage levels of the fifth node and the sixth node, respectively.

14. The receiver of claim 3,
wherein the divided strobe signals include first, second, third and fourth divided strobe signals that are each staggered by 90°, 180° and 270° relative to the other strobe signals;
wherein the sampling circuit includes:
a first slicer configured to generate a first bit of the sampled signal by sampling a first bit of the compensated data signal in response to the first divided strobe signal;
a second slicer configured to generate a second bit of the sampled signal by sampling a second bit of the compensated data signal in response to the third divided strobe signal;
a third slicer configured to generate a third bit of the sampled signal by sampling a third bit of the compensated data signal in response to the second divided strobe signal; and
a fourth slicer configured to generate a fourth bit of the sampled signal by sampling a fourth bit of the compensated data signal in response to the fourth divided strobe signal.

15. The receiver of claim 3,
wherein the control circuit is further configured to generate the weights including a first weight, a second weight, a third weight and a fourth weight; and
wherein the feedback circuit includes:
a first tap configured to generate the first feedback signal by multiplying the sampled signal with the first weight and provide the first feedback signal to the third through sixth summers;
a first delay element configured to output a first delayed sampled signal by delaying the sampled signal;
a second tap configured to generate the second feedback signal by multiplying the first delayed sampled signal with the second weight and provide the second feedback signal to the first and second summers;
a second delay element configured to output a second delayed sampled signal by delaying the first delayed sampled signal;
a third tap configured to generate the third feedback signal by multiplying the second delayed sampled signal with the third weight and provide the third feedback signal to the first and second summers;
a third delay element configured to output a third delayed sampled signal by delaying the second delayed sampled signal; and
a fourth tap configured to generate the fourth feedback signal by multiplying the third delayed sampled signal with the fourth weight and provide the fourth feedback signal to the first and second summers.

16. The receiver of claim 1, further comprising:
a divider configured to generate a first divided strobe signal, a second divided strobe signal, a third divided strobe signal and a fourth divided strobe signal, which have a phase differences of 90 degrees with respect to each other based on a data strobe signal including a first strobe signal and a second strobe signal, which have a phase differences of 180 degrees relative to each other.

17. A semiconductor memory device, comprising:
a receiver connected to a memory controller through a channel, the receiver configured to generate an output data based on a data signal received from the channel; and
a control logic circuit configured to control the receiver;
wherein the receiver comprises a decision feedback equalizer including a first stage and a second stage which include a plurality of summers cascade-connected, the decision feedback equalizer configured to:
generate a compensated data signal by summing a current value of the data signal and feedback signals based on a plurality of selection signals;
generate a sampled signal including a decision value by sampling bits of the compensated data signal based on divided strobe signals;
generate the feedback signals based on weights and the sampled signal corresponding to a previous value of the data signal;
provide a first portion of the feedback signals to the second stage; and
provide second portions of the feedback signals to the first stage;
a deserializer configured to generate an output data by deserializing the sampled signal; and
a control circuit configured to generate the plurality of selection signals and provide the plurality of selection signals to the decision feedback equalizer.

18. The semiconductor memory device of claim 17, further comprising:
a memory cell array including a plurality of memory cells coupled to a plurality of word-lines and a plurality of bit-lines, the memory cell array configured to store the output data; and
wherein the decision feedback equalizer includes:
a multi-stage summer circuit having the first stage and the second stage therein, the first stage configured to generate a first internal data signal and a second internal data signal based on the data signal and the second portions of the feedback signals, and the second stage configured to generate the compensated data signal based on the second internal data signal and the first portion of the feedback signals;
a sampling circuit configured to generate bits of the sampled signal by sampling the bits of the compensated data in response to the divided strobe signals; and a feedback circuit configured to generate the feedback signals by multiplying the sampled signal and delayed sampled signals with corresponding ones of the weights, where the delayed sampled signals are obtained by delaying the sampled signal by respective delay amounts.

19. The semiconductor memory device of claim 17, wherein the data signal is a multi-level signal having one of three or more voltage levels different from each other.

20. A receiver, comprising:

a decision feedback equalizer including a first stage and a second stage which include a plurality of summers cascade-connected, the decision feedback equalizer configured to:

generate a compensated data signal by summing a current value of a data signal and feedback signals based on a plurality of selection signals;

generate a sampled signal including a decision value by sampling bits of the compensated data signal based on divided strobe signals;

generate the feedback signals based on weights and the sampled signal corresponding to a previous value of the data signal;

provide a first portion of the feedback signals to the second stage; and provide second portions of the feedback signals to the first stage;

a deserializer configured to generate an output data by deserializing the sampled signal; and a control circuit configured to generate the plurality of selection signals and provide the plurality of selection signals to the decision feedback equalizer, wherein the decision feedback equalizer is configured to:

generate a first internal data signal and a second internal data signal by summing the data signal and the second portions of the feedback signals; and generate the compensated data signal by summing the first internal data signal, the second internal data signal and the first portion of the feedback signals by a time division scheme based on the plurality selection signals.

* * * * *